United States Patent
Alexander et al.

(10) Patent No.: US 11,912,313 B2
(45) Date of Patent: Feb. 27, 2024

(54) HUMAN MACHINE INTERACTION MONITOR

(71) Applicant: Arriver Software LLC, Novi, MI (US)

(72) Inventors: Rachel Alexander, Chicago, IL (US); Shabin Mahadevan, Lake Orion, MI (US)

(73) Assignee: Arriver Software LLC, San Diego, CA (US)

( * ) Notice: Subject to any disclaimer, the term of this patent is extended or adjusted under 35 U.S.C. 154(b) by 96 days.

(21) Appl. No.: 17/493,144

(22) Filed: Oct. 4, 2021

(65) Prior Publication Data

US 2023/0106487 A1 Apr. 6, 2023

(51) Int. Cl.
*B60W 60/00* (2020.01)
*B60W 40/08* (2012.01)
(Continued)

(52) U.S. Cl.
CPC ........ *B60W 60/0059* (2020.02); *B60W 40/08* (2013.01); *B60W 50/16* (2013.01); *B60W 60/0053* (2020.02); *B60W 2040/0818* (2013.01); *B60W 2050/0088* (2013.01); *B60W 2050/143* (2013.01); *B60W 2540/225* (2020.02); *B60W 2540/229* (2020.02)

(58) Field of Classification Search
CPC .. B60W 60/0059; B60W 40/08; B60W 50/16; B60W 60/0053; B60W 2040/0818; B60W 2050/0088; B60W 2050/143; B60W 2540/225; B60W 2540/229
See application file for complete search history.

(56) References Cited

U.S. PATENT DOCUMENTS 6,661,345 B1 12/2003 Bevan et al.
10,241,509 B1 * 3/2019 Fields ................ A61B 5/4064
(Continued)

FOREIGN PATENT DOCUMENTS

| EP | 2284057 A2 | 2/2011 |
|---|---|---|
| EP | 3640109 A1 | 4/2020 |
| WO | WO2001/031604 | 5/2001 |

OTHER PUBLICATIONS

International Search Report and Written Opinion—PCT/US2022/044402—ISA/EPO—dated Jan. 9, 2023.

*Primary Examiner* — Mohamed Barakat
(74) *Attorney, Agent, or Firm* — Arriver Software LLC

(57) ABSTRACT

An apparatus comprises an interface and a control circuit. The interface may be configured to receive a plurality of sensor signals from a vehicle platform of a vehicle and present one or more control signals to the vehicle platform. The control circuit may be configured to (i) detect whether an attention state of a driver is in an attentive state or an inattentive state in response to one or more of the plurality of sensor signals from the vehicle platform during a first window having a first duration, (ii) assess whether the driver is sufficiently attentive by monitoring the one or more of the plurality of sensor signals from the vehicle platform and determining whether changes in the attention state of the driver during a second window having a second duration that is longer than the first duration exceeds a threshold, and (iii) when the threshold is exceeded, transition operation of the vehicle to the driver and safely discontinue an automation system function of the vehicle.

15 Claims, 14 Drawing Sheets

(51) Int. Cl.
*B60W 50/16* (2020.01)
*B60W 50/00* (2006.01)
*B60W 50/14* (2020.01)

(56) References Cited

U.S. PATENT DOCUMENTS

| | | | |
|---|---|---|---|
| 11,237,554 B2* | 2/2022 | Rezaeian | G06F 3/013 |
| 2010/0117814 A1* | 5/2010 | Lermer | G08B 21/06 |
| | | | 340/439 |
| 2013/0131907 A1 | 5/2013 | Green et al. | |
| 2014/0244096 A1 | 8/2014 | An et al. | |
| 2017/0355377 A1* | 12/2017 | Vijaya Kumar | B60W 50/0098 |
| 2019/0129416 A1* | 5/2019 | Upmanue | B60W 50/14 |
| 2020/0339131 A1* | 10/2020 | Olsson | B60W 50/0205 |
| 2021/0188288 A1 | 6/2021 | Yagi | |

\* cited by examiner

HUMAN MACHINE INTERACTION MONITOR

FIELD OF THE INVENTION

The invention relates to advanced driver assistance systems generally and, more particularly, to a method and/or apparatus for implementing a human machine interaction monitor.

BACKGROUND

Production driver attention tracking features on the market today employ algorithms to track and categorize visual attention of drivers. However, driver attention tracking features cannot be relied upon solely to keep a driver functionally vigilant (and thereby meet safety goals) due to numerous human factors related challenges in keeping the driver engaged in the driving task. Foreseeable misuse and types of abuse of similar features that have been documented in the market today need to be taken into account. The misuse can result in edge cases where a driver attention tracking feature labels the driver as fully aware thereby keeping an automation feature active while the driver cannot intervene in case of any hazardous event. Hence, there is a need to detect a driver who is no longer sufficiently attentive to act as a safety net for the driver attention tracking feature.

It would be desirable to implement a human machine interaction monitor to ensure driver engagement during supervision of assisted (collaborative) driving automation.

SUMMARY

The invention concerns an apparatus comprising an interface and a control circuit. The interface may be configured to receive a plurality of sensor signals from a vehicle platform of a vehicle and present one or more control signals to the vehicle platform. The control circuit may be configured to (i) detect whether an attention state of a driver is in an attentive state or an inattentive state in response to one or more of the plurality of sensor signals from the vehicle platform during a first window having a first duration, (ii) assess whether the driver is sufficiently attentive by monitoring the one or more of the plurality of sensor signals from the vehicle platform and determining whether changes in the attention state of the driver during a second window having a second duration that is longer than the first duration exceeds a threshold, and (iii) when the threshold is exceeded, transition operation of the vehicle to the driver and safely discontinue an automation system function of the vehicle.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
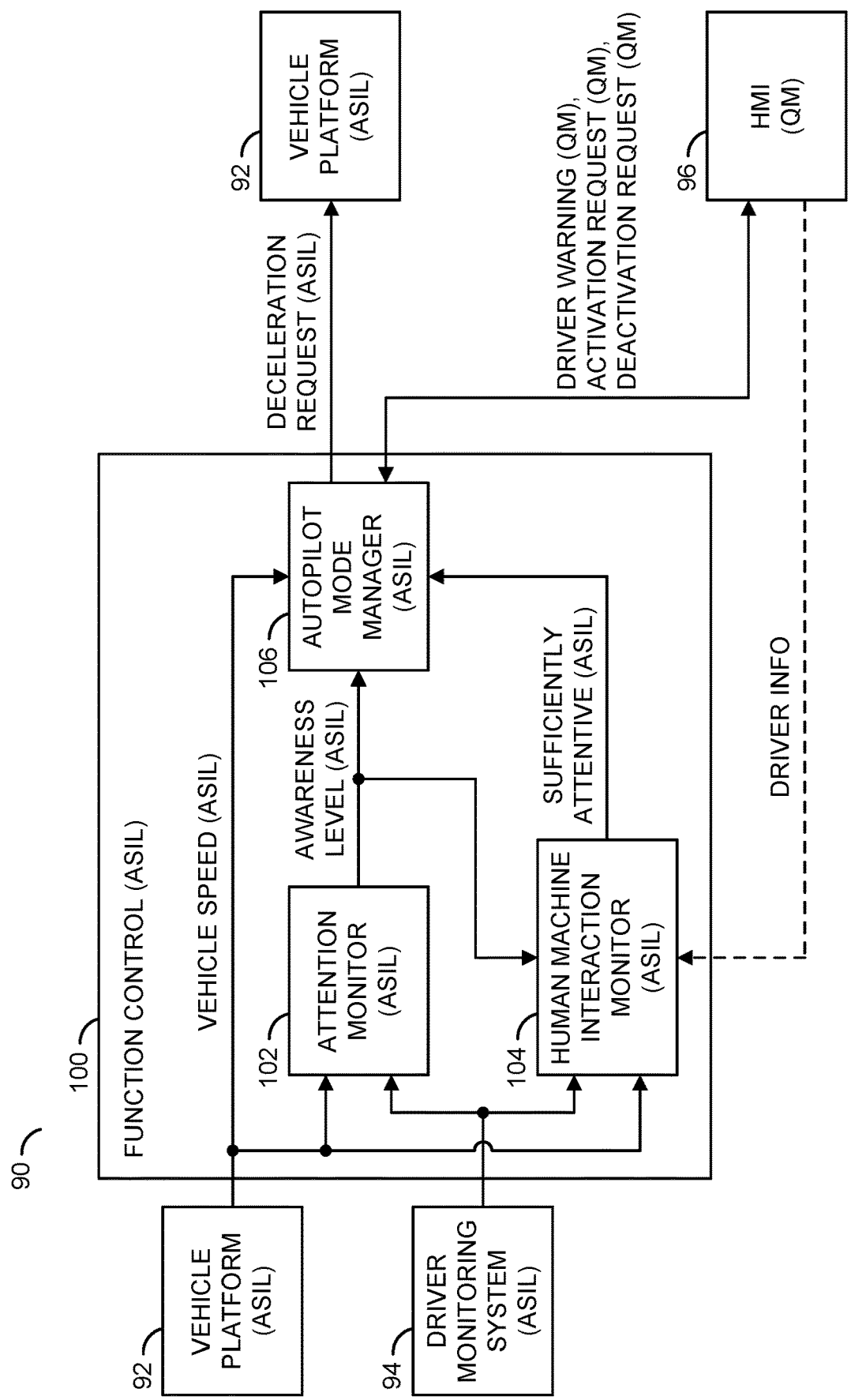
FIG. 1 is a diagram illustrating a system in accordance with an embodiment of the invention.

Embodiments of the present invention include providing a human machine interaction monitor that may (i) provide a driver awareness level escalation regime that generates warnings at a number (e.g., 3) of different levels via a human machine (or vehicle) interface (HMI) of a vehicle, (ii) detect insufficient attention related to short term shared visual attention (e.g., from involvement in secondary tasks), (iii) take into account foreseeable misuse and types of abuse of similar features that have been documented in the market, (iv) detect and mitigate edge cases where the driver is labeled as fully aware thereby keeping an automation feature active while the driver is not able to intervene in case of a hazardous event, (v) provide additional functionality to methodically detect a driver who is no longer sufficiently attentive to act as a safety net for a driver attention tracking feature, (vi) detect insufficient detection of inattention when the HMI is not working or there is driver misuse, (vii) track glance distribution over a longer time duration than a duration of time an awareness monitor tracks off-road glance behavior, (viii) utilize outputs from both human machine interaction monitoring and awareness monitoring to affect kinesthetics and longitudinal control of the vehicle, and/or (ix) be implemented as one or more integrated circuits.

A safety goal (e.g., Society of Automotive Engineers Level 2-3 (SAE L2+)) is generally imposed on partial (collaborative) driving automation features to not be operational unless the driver is attentive. An attentive driver can intervene in a timely manner to mitigate hazardous events that can arise due to feature limitations. Driver inattention is of primary concern today with SAE L2+ automation systems that assume lateral and longitudinal steering functions. The safety case depends on a sufficiently attentive driver being able to take control in hazardous situations where a limitation in the operational capability of the automation system is reached. There is an ever growing need to design safe and intelligent collaborative driving systems to provide the necessary user value through automation while still conditioning the user into appropriate attentional compliance. Hence, there is a need for a solution to methodically detect whether the driver is attentive and reach an appropriate safe state when the driver is no longer attentive.

In order to best achieve attentional compliance, a clear and consistent mental model for the driver needs to be established. Driver understanding of the capabilities and the limitations of an automation system may largely inform how the driver interacts with the automation system. An accurate representation of the mental model for the driver is critical to (i) how likely drivers are to respond to safety critical situations where timely intervention is required, (ii) the development of trust in the system that can lead to over-reliance or under-use, and (iii) the overall concept the driver has of operation of the system.

Of especially complex concern is the extent to which semi-automated systems impact information processing capabilities and cognitive off-loading of the driver, including the likelihood of the driver to engage in distracting secondary tasks. As the role of the driver shifts from full time active operator to intermittently passive supervisor, system design needs to ensure the driver is still able to perceive critical changes in the driving environment and system status.

In various embodiments, a method and system are provided for monitoring driver awareness, including providing feedback to the driver, evaluating driver behavior over time, and enabling advanced driver-assistance systems (ADAS) functionality when driver awareness is at an acceptable level. In various embodiments, a driver awareness estimator (DAE) may be implemented to monitor the attention level of the driver over time and provide feedback (e.g., warnings) to the driver (e.g., using a human machine interface (HMI) of a vehicle). The HMI generally provides a connection between the driver and the vehicle, such that reaction of the driver to warnings may be observed, over an extended period of time, by the driver awareness estimator system. In an example, a system in accordance with an embodiment of the invention may utilize the observations made using the DAE to improve the quality of driver attention assessment. In an example, various ADAS features may be disabled when the driver behavior monitored over the extended period of time exceeds a particular threshold. In various embodiments, the system may provide improved driver attention. The system may also reduce a possibility for a driver to override (e.g., cheat, game, etc.) a driver monitoring system (DMS) of a vehicle.

In various embodiments, the DAE generally comprises two separate functionalities, an attention (or awareness) monitor and a human machine interaction monitor (HMIM). The attention monitor may function to determine a state of a driver (e.g., eyes on the road, inattentive, temporarily unaware, out-of-the-loop, dozing off, etc.) during short (e.g., a few seconds) windows of time. In an example, the attention monitor may track eye blinking or a line of sight of the driver using, for example, eye tracking information from a driver monitoring system of the vehicle, and then determines whether the driver is unaware or is inattentive. In an example, the attention monitor may perform eye tracking using a camera of the driver monitoring system. The attention monitor may also check whether a personal device or each device in the vehicle is used and then determine whether the driver is inattentive. The attention monitor may further determine the state of the driver based on driving information, such as speed, steering angle, and variability of the speed of the vehicle. In an example, the attention monitor may provide a driver awareness level escalation regime that generates warnings at a number (e.g., 3, etc.) of different levels via the human machine interface (HMI) and may detect insufficient attention related to short term shared visual attention (e.g., from involvement in secondary tasks). The attention monitor may be implemented similarly to existing attention tracking features on the market today that employ algorithms to track and categorize visual attention of drivers.

In various embodiments, the DAE does not rely solely on the attention monitor to keep the driver functionally vigilant (and thereby meet the safety goal) due to numerous human factors related challenges in keeping the driver engaged in the driving task. In various embodiments, the DAE may account for foreseeable misuse and the types of abuse of similar features that have been documented in the market today. For example, misuse may result in edge cases where the attention monitor labels the driver as fully aware, thereby keeping an automation feature active, while the driver cannot intervene in case of any hazardous event. Hence, the DAE in accordance with an embodiment of the invention generally includes an additional functionality to methodically detect a driver who is no longer sufficiently attentive to act as a safety net for the attention monitor. The additional functionality is generally provided by the human machine interaction monitor (HMIM) in accordance with an embodiment of the invention. The HMIM generally provides a more diversified assessment of driver inattention, providing an additional layer of safety on top of the attention monitor.

Referring to FIG. 1, a diagram is shown illustrating a system in accordance with an embodiment of the invention. In an example, a system (or apparatus) 90 may implement an advanced driver-assistance system (ADAS). In various embodiments, the system 90 may comprise a vehicle platform 92, a driver monitoring system (DMS) 94, a human machine (or vehicle) interface (HMI) 96, and a function control module 100. In various embodiments, the vehicle platform 92, the driver monitoring system (DMS) 94, and the function control module 100 may be implemented as Automotive Safety Integrity Level (ASIL), while the human machine interface (HMI) 96 may be implemented as Quality Management (QM).

Automotive Safety Integrity Level (ASIL) is a risk classification scheme defined by the ISO 26262—Functional Safety for Road Vehicles standard. This is an adaptation of the Safety Integrity Level (SIL) used in IEC 61508 for the automotive industry. The ASIL classification helps defining the safety requirements needed to be in line with the ISO 26262 standard to keep the risk to an acceptable level. The ASIL is established by performing a risk analysis of a potentially hazardous scenario by looking at the Severity, Exposure and Controllability of the vehicle operating scenario. The safety goal for that hazardous scenario in turn carries the ASIL requirements. The ASILs range from ASIL D, representing the highest degree of risk of a hazardous scenario turning into a mishap and highest degree of rigor needed to be applied in the assurance of the resultant safety requirements, to QM, representing applications with no automotive hazardous scenarios with unacceptable risk and, therefore, no safety requirements to manage under the ISO 26262 safety processes. The level QM, referring to "Quality Management", means that risk associated with a hazardous event is not unreasonable and does not therefore require safety measures in accordance with ISO 26262. The intervening levels (ASIL C, ASIL B, and ASIL A) are simply a range of varying degrees of hazard risk levels and degrees of assurance required.

The standard defines functional safety as "the absence of unreasonable risk due to hazards caused by malfunctioning behavior of electrical or electronic systems." ASILs establish safety requirements, based on the probability and severity of harm, for automotive components to be compliant with ISO 26262. Systems like airbags, anti-lock brakes, and power steering require an ASIL D grade—the highest rigor applied to safety assurance-because the risks associated with their failure are the highest. On the other end of the safety spectrum, components like wiper systems require only an ASIL A grade. Headlights and brake lights generally would be ASIL B, as would be rear lights due to risk of rear collisions, while automatic emergency brake systems would generally be ASIL C due to risks associated with the unintended deceleration.

In an example, the vehicle platform 92, the DMS 94, and the HMI 96 may provide input signals to the function control module 100. In an example, the vehicle platform 92 may provide an input signal (e.g., VEHICLE SPEED) communicating vehicle speed to the function control module 100. The DMS 94 may provide input signals communicating information related to driver awareness (e.g., driver eye movement, driver hand positions, steering angle, etc.). In an example, the HMI 96 may provide a first input signal (e.g., ACTIVATION REQUEST) and a second input signal (e.g., DEACTIVATION REQUEST) to the function control module 100. The signal ACTIVATION REQUEST may communicate a request from the driver to activate an ADAS feature controlled by the function control module 100. The signal DEACTIVATION REQUEST may communicate a request from the driver to de-activate the ADAS feature controlled by the function control module 100. In some embodiments, the HMI 96 may optionally present an input signal (e.g., DRIVER INFO) communicating information about the particular driver operating the vehicle. In various embodiments, the signals VEHICLE SPEED and DECELERATION REQUEST may be implemented as ASIL, and the signals ACTIVATION REQUEST and DEACTIVATION REQUEST may be implemented as QM.

In an example, the function control module 100 may provide output signals to the vehicle platform 92 and the HMI 96. In an example, the function control module 100 may present an output signal (e.g., DECELERATION REQUEST) to the vehicle platform 92. The signal DECELERATION REQUEST may be configured to allow the function control module 100 to bring the vehicle to a safe stop. The function control module 100 may present a signal (e.g., DRIVER WARNING) to the HMI 96. The signal DRIVER WARNING may communication information to cause the HMI 96 to present a particular warning to the driver. In various embodiments, the signal DRIVER WARNING may be implemented as QM.

In an example, the function control module 100 may comprise a block (or circuit) 102, a block (or circuit) 104, and a block (or circuit) 106. The block 102 may be implemented as an attention (or awareness) monitor. The block 104 may be implemented as a human machine interaction monitor (HMIM). The block 106 may be implemented as ADAS feature mode manager. In one example, the block 106 may be implemented as an autopilot mode manager. In various embodiments, the blocks 102, 104, and 106 are generally implemented as ASIL. In an example, the signal VEHICLE SPEED may be presented to a first input of the block 102, a first input of the block 104, and a first input of the block 106. The signals from the DMS 94 may be presented to a second input of the block 102 and a second input of the block 104. The block 102 may present a signal (e.g., AWARENESS LEVEL) to a third input of the block 104 and a second input of the block 106. The signal AWARENESS LEVEL may be implemented as ASIL. The block 104 may present a signal (e.g., SUFFICIENTLY ATTENTIVE) to a third input of the block 106. The signal SUFFICIENTLY ATTENTIVE may be implemented as ASIL. In embodiments where the HMI 96 provides the signal DRIVER INFO to the function control module 100, the signal DRIVER INFO may be presented to a fourth input of the block 104.

In various embodiments, the block 102 and the block 104 may be configured as a driver awareness estimator (DAE) to methodically detect whether a driver is attentive and reach an appropriate safe state when the driver is no longer attentive. In an example, the attention monitor 102 may provide a driver awareness level escalation regime that generates warnings at a number (e.g., 3) of different levels via the HMI 96 and may detect insufficient attention related to short term shared visual attention (e.g., from involvement in secondary tasks). The attention monitor 102 may be implemented similarly to existing production attention tracking features on the market today that employ algorithms to track and categorize visual attention of drivers.

In various embodiments, the driver awareness estimator (DAE) does not rely solely on the attention monitor 102 to keep the driver functionally vigilant (and thereby meet the safety goal) due to numerous human factors related challenges in keeping the driver engaged in the driving task. In various embodiments, the driver awareness estimator (DAE) may account for foreseeable misuse and the types of abuse of similar features that have been documented in the market today. For example, misuse can result in edge cases where the attention monitor 102 labels the driver as fully aware thereby keeping an automation feature controlled by the function control module 100 active while the driver cannot intervene in case of any hazardous event. Hence, the driver awareness estimator (DAE) in accordance with an embodiment of the invention generally utilizes the HMIM 104 to provide an additional functionality to methodically detect a driver who is no longer sufficiently attentive to act as a safety net for the attention monitor 102.

The HMIM 104 is generally configured to detect insufficient attention when the HMI 96 is not working or there is driver misuse. In an example, the HMIM 104 may look at the off-road glance distribution pattern of the driver by analyzing the toggle behavior between awareness levels reported by attention monitor 102 over a longer duration of time than the duration (or window) of time used by the attention monitor 102. In various embodiments, long-term glance distribution patterns may be used to affect the kinesthetics and longitudinal control of the vehicle platform 92. In an example, the HMIM 104 may focus on a longer-term assessment based on toggle behavior between attentiveness states reported by the attention monitor 102. By monitoring the awareness level of the driver (e.g., as captured by the time-distribution of the awareness states) in a given time window, a tunable (or programmable) number of transitions and an acceptable total time within each state of awareness may be defined. Using assisted driving (e.g., adaptive cruise control (ACC), etc.) glance behavior as the gold standard, driver engagement may be calculated based on the glance distribution patterns. The HMIM 104 generally prevents the driver from repeatedly entering into lower awareness states over a longer duration of time that may affect driver controllability by assessing the longer-term glance patterns of the driver and then triggering a transfer of control to the driver and a transition of the vehicle to a safe state (e.g., via the signal DECELERATION REQUEST, etc.).

Figure 2:
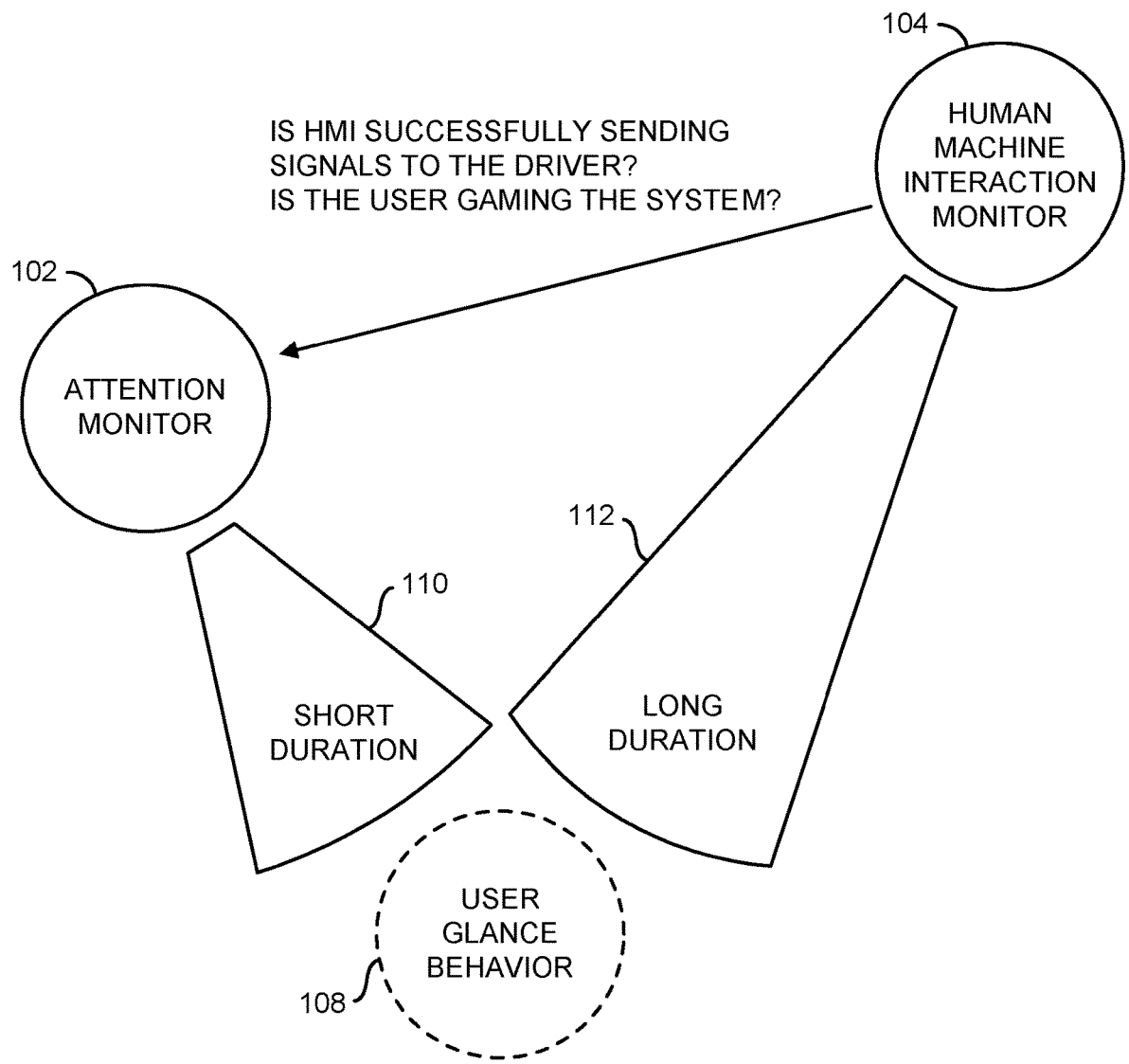
FIG. 2 is a diagram illustrating an example implementation utilizing glance behavior as a measure of driver attentiveness.

Referring to FIG. 2, a diagram is shown illustrating an example implementation of a driver awareness estimator utilizing glance behavior as a measure of driver attentiveness. Design of increasingly advanced supervised systems is complex due to the critical role of the human-in-the-loop. Successful design ensures the driver is engaged and able to take over when needed during alerted failures, silent failures, and other transitions of control. Developing a forced vigilance system involves a deep understanding of user perception, cognition, and response behavior. In an example, the attention monitor 102 generally implements a driver awareness level escalation regime that may generate warnings at a number of different levels via the HMI 96 and detects insufficient attention related to short term shared visual attention (e.g., from involvement in a secondary tasks). In an example, the attention monitor 102 may observe driver glance behavior 108 over a short duration of time window 110 to determine an awareness level. In an example, if over the short period of time (e.g., a few seconds) the driver is eyes-off-road 50% of the time or over a longer period of time (e.g., 4-5 times as long as the short period) the driver is eyes-off-road 30% of the time, the attention monitor 102 may indicate the driver is not aware. In an example, the attention monitor 102 may generate warnings at three different levels: temporarily unaware, unaware, out of the loop. In an example, the number of warnings may include, but are not limited to, auditory and visual reminders, haptic reminder (e.g., seat vibration), hands on, reduced propulsion, take over request, and slow into a safe stop.

In an example, the HMIM 104 may observe the driver glance behavior 108 over a long duration of time window 112 to determine whether the driver is sufficiently aware. In an example, the HMIM 104 may detect insufficient attention when the HMI 96 is not working as desired (e.g., given that the HMI 96 is typically QM) or there is misuse, by looking at the off-road glance distribution over a longer period of time than the attention monitor 102. In an example, the HMIM 104 may be configured to utilize the HMI 96 and the attention monitor 102 to detect whether the HMI 96 is successfully sending signals to the driver. For example, hardware or tracking failure generally means the driver is not receiving signals from the HMI 96. In another example, the HMIM 104 may be configured to utilize the HMI 96 and the attention monitor 102 to detect whether the driver is gaming (abusing) the system 90. For example, the driver may be misusing the system by maximizing eyes-off-road time continuously by bouncing between aware and temporarily unaware states.

Figure 3:
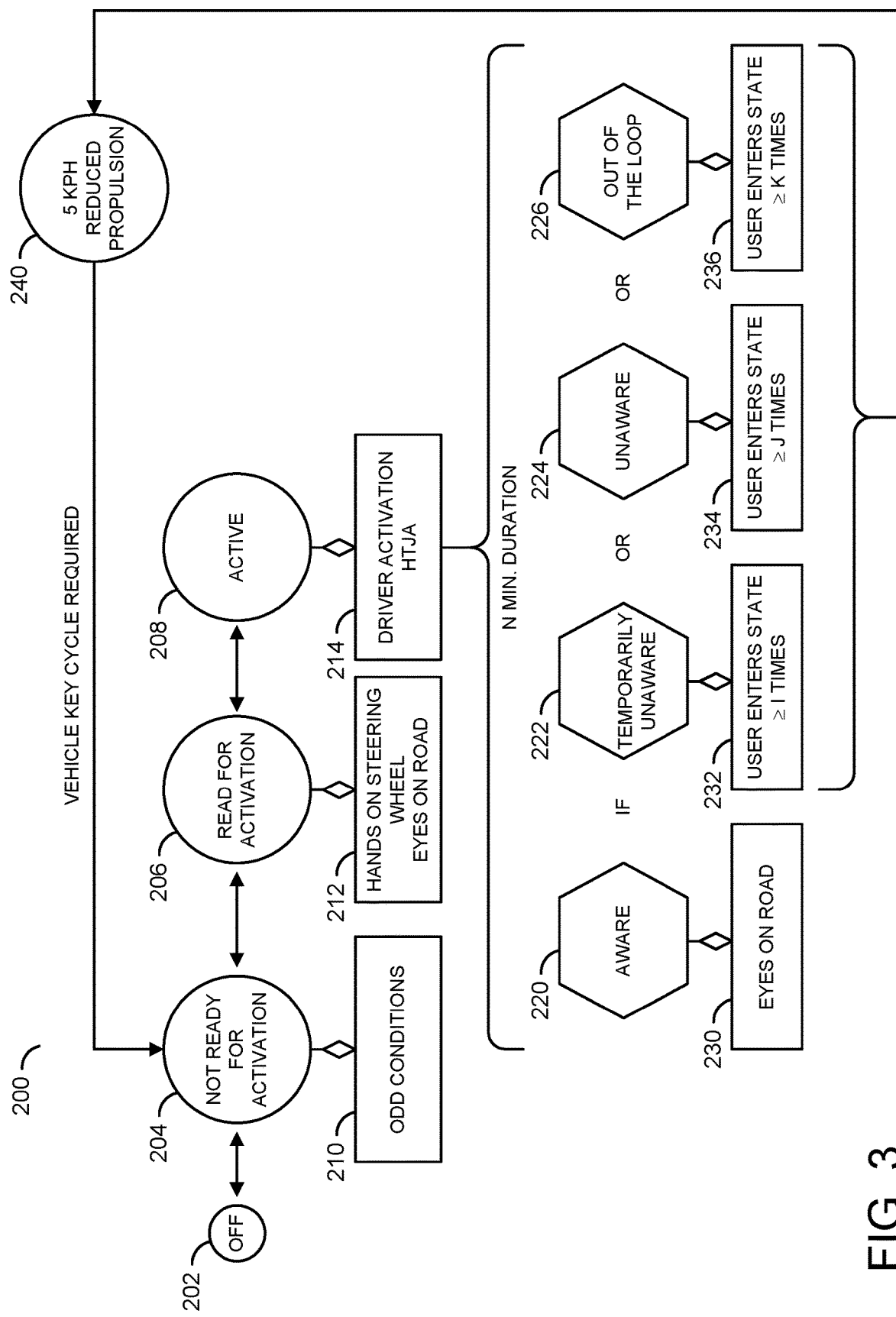
FIG. 3 is a flow diagram illustrating example operational states of a system in accordance with an embodiment of the invention.

Referring to FIG. 3, a flow diagram is shown illustrating example operational states of the HMIM system in accordance with an embodiment of the invention. In an example, a feature control process 200 may comprise a plurality of states of the HMIM system in accordance with an embodiment of the invention. In an example, the plurality of states may comprise a number of feature states and a number of driver awareness states. In various embodiments, the HMIM 104 monitors the awareness level of the driver (e.g., as captured by a time-distribution of the driver awareness states of the driver awareness estimator (DAE)) and defines an acceptable number of transitions and/or an acceptable total time within a particular DAE state. In an example, the control process (or method) 200 may comprise a step (or state) 202, a step (or state) 204, a step (or state) 206, a step (or state) 208, a step (or state) 210, a step (or state) 212, a step (or state) 214, a step (or state) 216, a step (or state) 218, a step (or state) 220, a step (or state) 222, a step (or state) 224, a step (or state) 226, a step (or state) 228, a step (or state) 230, a step (or state) 232, a step (or state) 234, and a step (or state) 236.

In an example, the process 200 may begin in the state 202 with the ADAS feature OFF and transition to the state 204. In the state 204, the ADAS feature is not ready for activation. The ADAS feature may remain not ready for activation until operational design domain (ODD) conditions 210 are appropriate for activation. The operational design domain (ODD) safety concept ensures a Society of Automotive Engineers Level 2-3 (SAE L2+) driver assistance feature is acceptably safe by reducing the exposure to challenging operational situations. Challenging operational situations are operational situations judged to be outside the known capabilities of advanced driver-assistance systems (ADAS) and, therefore, are considered hazardous. The goal of the ODD safety concept is to be able to identify at least 99% of operational situations in order to minimize exposure to hazard scenarios.

When the ODD conditions 210 are appropriate for activation, the process 200 may move to the state 206. In the state 206, the ADAS feature is ready for activation. The process 200 may remain in the state 206 until the driver is observed to be in the state 212 (e.g., hands on steering wheel and eyes on road). When the driver is in the state 212, the process 200 may move to the state 208, upon receiving a driver activation request 214. In the state 208, the ADAS feature is active. With the ADAS feature active, the process 200 may monitor the awareness level of the driver as captured by the time-distribution of DAE states 220-226.

The process 200 may define acceptable numbers of awareness state transitions and/or an acceptable total time within a particular DAE state. In an example, the process 200 may set a particular duration (e.g., N minutes) and numbers of transitions (e.g., I, J, and K) from the driver awareness state 220, where the driver is considered aware based on an eyes on road observation 230, to the driver awareness states 222, 224, and 226, respectively. In an example, the process 200 may set a first criterion (or threshold) 232 for determining whether the driver is considered to be in a temporarily unaware state 222 (e.g., the number of times the driver enters the state 222 is greater than or equal to I), a second criterion (or threshold) 234 for determining whether the driver is considered to be in an unaware state 224 (e.g., the number of times the driver enters the state 224 is greater than or equal to J), and a third criterion (or threshold) 236 for determining whether the driver is considered to be in an out-of-the-loop state 226 (e.g., the number of times the driver enters the state 226 is greater than or equal to K). In an example, the values I, J, and K may represent a maximum acceptable number of transitions of the respective driver awareness state during the particular duration selected. In an example, the process 200 may move to the state 240 when one or more of the criteria 232, 234, and 236 are met during the particular duration selected. In an example, the duration N and the criteria 232, 234, and 236 may be programmable. In an example, the thresholds I, J, and K may be similar or different. In an example, the thresholds I, J, and K may be set based on a profile of a particular driver. In an example, the criteria 232, 234, and 236 may be modified as the HMIM 104 learns a behavior (e.g., glance behavior) distribution of a particular driver.

In the state 240, the process 200 may notify the driver to take over operation of the vehicle and reduce the vehicle propulsion to a particular speed that is considered safe (e.g., 5 kph). The process 200 may then move to the state 204, where the ADAS feature remains not ready for activation until the driver takes a particular action (e.g., cycles the ignition switch).

Figure 4:
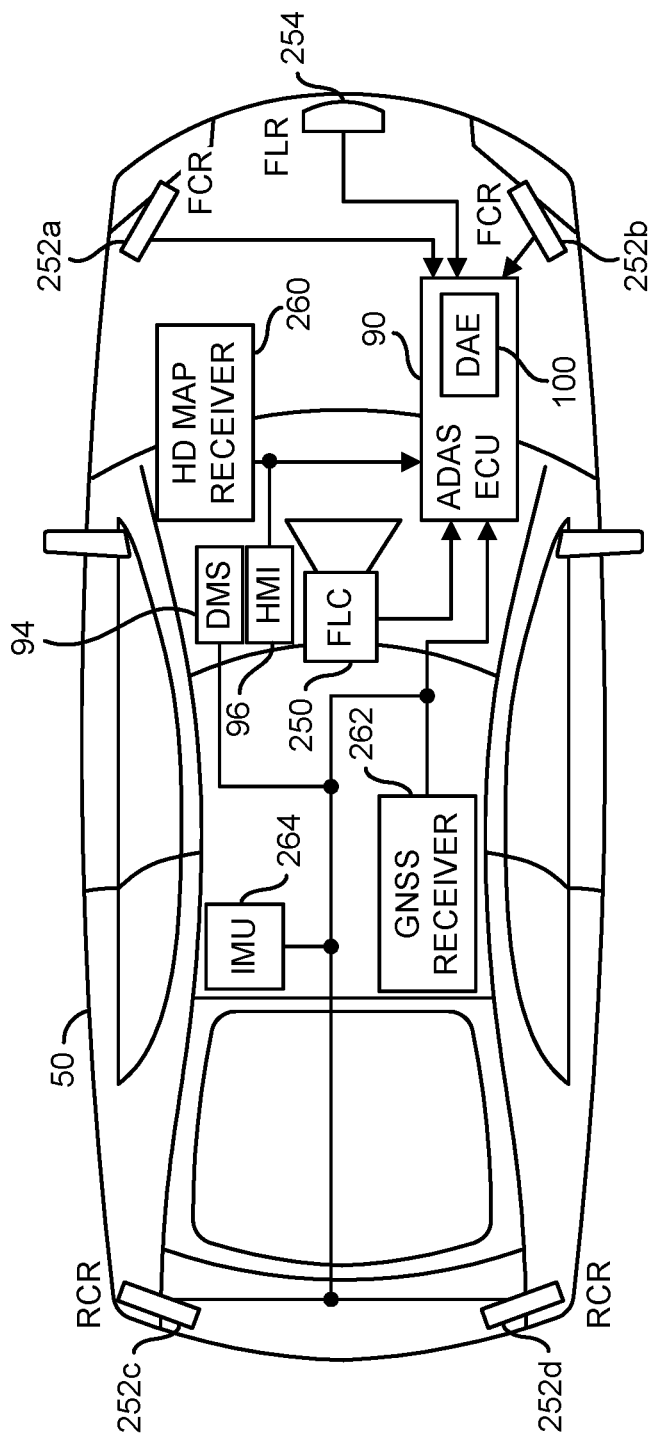
FIG. 4 is a diagram illustrating an implementation of an advanced driver-assistance systems (ADAS) human machine interaction monitor in accordance with an example embodiment of the present invention.

Referring to FIG. 4, a diagram is shown illustrating an implementation of the system 100 in accordance with an example embodiment of the invention. In an example, the apparatus (or system) 100 may be mounted totally within, or at least partially within a vehicle 50. In an example, the system (or apparatus) 100 may be implemented as part of an advanced driver-assistance systems (ADAS) electronic control unit (ECU) 90. In various embodiments, the system 100 implementing the driver attentiveness estimator (DAE) may be implemented within the ADAS ECU 90 of the vehicle 50. The ADAS ECU 90 may be connected to the vehicle platform 92 of the vehicle 50. The vehicle 50 may include the driver monitoring system (DMS) 94, the human machine interface (HMI) 96, a forward looking camera (FLC) 250, a number of corner radar sensors 252a-252d, a number of front side radar sensors (not shown), a forward looking radar (FLR) sensor 254, a high-definition (HD) map receiver 260, a global navigation satellite system (GNSS) receiver 262, and an inertial measurement unit (IMU) 264. In some embodiments, the vehicle 50 may also include LIDAR sensors and/or sonar sensors (not shown).

The forward looking camera (FLC) 250 is generally used to detect and identify objects and road features in front of the vehicle 50. In an example, the forward looking camera (FLC) 250 may be configured to provide stereoscopic vision with a 100-degree field of view (FOV). In an example, the forward looking camera (FLC) 250 may be used to detect road markings (e.g., lane markings, etc.), road signs, traffic lights, structures, etc. The corner radar sensors 252a-252d and the forward looking radar (FLR) sensor 254 (and LIDAR and/or sonar sensors when present) are generally used to detect and track objects. In an example, each of the corner radar sensors 252a-252d may have a 140-degree FOV. In an example, the forward looking radar sensor (FLR) 254 may have two FOVs, an 18-degree FOV for long-range sensing and a 90-degree FOV for short range sensing. The IMU 264 generally reports the orientation, angular velocity and acceleration, and forces acting on the vehicle 50.

In an example, the DMS 94, the HD map receiver 260, the GNSS receiver 262, the FLC 250, the FCRs 252a-252b, and the FLR 254 may be connected to the system 90. In an example, the DMS 94, the HD map receiver 260, the GNSS receiver 262, the FLC 250, the FCRs 252a-252b, and the FLR 254 may be connected to the system 90 via one or more vehicle buses of the vehicle 50. In another example, the DMS 94, the HD map receiver 260, the GNSS receiver 262, the FLC 250, the FCRs 252a-252b, and the FLR 254 may be connected to the system 90 via a wireless protocol. In an example, the DMS 94 may convey driver attentiveness information to the system 90. The FLC 250 may convey surrounding road information (e.g., lane widths, marker types, lane marker crossing indications, and video) to the system 90. The GNSS receiver 262 may convey position data (e.g., latitude value, longitude value, adjustment information and confidence information) to the system 90. The HD map receiver 260 may transfer map data to the system 90.

The FLC 250 may implement an optical sensor. In various embodiments, the FLC 250 may be an optical camera. The FLC 250 is generally operational to provide the surrounding road information (or image data) to the system 90. The road information may include, but is not limited to, lane width data, marker type data, lane change indicators, and video of a roadway ahead of the vehicle 50 within the field of view of the FLC 250. In various embodiments, the FLC 250 may be a color camera. The color may be useful for distinguishing between solid-yellow lane markers (e.g., leftmost lane markers) from solid-white lane markers (e.g., rightmost lane markers). In various embodiments, the FLC 250 may provide an estimated lane width for at least a current lane in the center of the field of view of the FLC 250. In some embodiments, the FLC 250 may provide estimated lane widths for the lane(s) neighboring the center lane. In other embodiments, the FLC 250 may provide estimated lane widths for all of the lanes within the field of view of the FLC 250. The lane widths may be determined using standard image recognition methods and standard analysis methods implemented in the FLC 250. The FLC 250 may also identify all lane markers within the field of view of the FLC 250. When the FLC 250 crosses over a lane marker, the FLC 250 may notify the system 90 that a lane change is occurring. Identification of the lane markers and the lane changes may be determined using standard image recognition methods and standard analysis methods implemented in the FLC 250. The FLC 250 may transfer the road information to the system 90 via a vehicle bus or a wireless protocol.

One or more other types of sensors may be used in conjunction with the FLC 250. Example sensors may include, but are not limited to, radar sensors, light detection and ranging (LiDAR) sensors, inertial sensors, thermal imaging sensors, and/or acoustic sensors. Some of the sensors may detect objects on the side of the road to provide estimations of a left boundary and a right boundary of the road. From the left boundary and the right boundary, a width of the road may be calculated. From the calculated width, an estimation of how many lanes probably fit within the width may be made based on a standard lane width. Thereafter, the sensors may estimate the current lane that the vehicle 50 occupies based on the relative distances of the sensors on the vehicle 50 to the left boundary and the right boundary of the road and the estimated number of lanes. Lane crossovers may be determined by the sensors based on the estimated numbers of lanes and changes in the relative distances to the left boundary and/or the right boundary.

The system 90 may implement a control circuit (e.g., an electronic control unit). The system 90 is generally operational to keep track of the current lane that the vehicle 50 occupies and correct the current position of the vehicle 50 to a center of the current lane. The tracking may be based on the satellite position data received in the GNSS receiver 262, the map data received from the HD map receiver 260, and the road information received in the vision detections from the FLC 250 and the radar detections received from the FCRs 252a-252b and the FLR 254. The satellite position data may include an adjustment value and a corresponding confidence value.

The GNSS receiver 262 may implement a satellite-navigation device. In various embodiments, the GNSS receiver 262 may include a Global Positioning System (GPS) receiver. Other types of satellite-navigation devices may be implemented to meet the design criteria of a particular application. The GNSS receiver 262 is generally operational to provide the latitude data and the longitude data of the vehicle 50 based on the GNSS signals received from a number of satellites. The GNSS receiver 262 may also be operational to adjust the latitude data and the longitude data based on the adjustment value and a corresponding confidence value received from the system 90. The confidence value may have a range from zero (e.g., unreliable) to one (e.g., reliable). If the confidence value is above a high threshold (e.g., >0.7), the GNSS receiver 262 may correct the latitude data and the longitude data per the adjustment value. If the confidence value is below a low threshold (e.g., <0.3), the GNSS receiver 262 may ignore the adjustment value. If the confidence value is between the high threshold and the low threshold, the GNSS receiver 262 may apply a correction to both the latitude data and the longitude data that is a linear weighting based on the degree of confidence.

The HD map receiver 260 may implement a radio-frequency receiver. The HD map receiver 260 may be operational to receive the map data from an antenna (not shown). The map data may be converted to a digital form and presented to the system 90.

Figure 5:
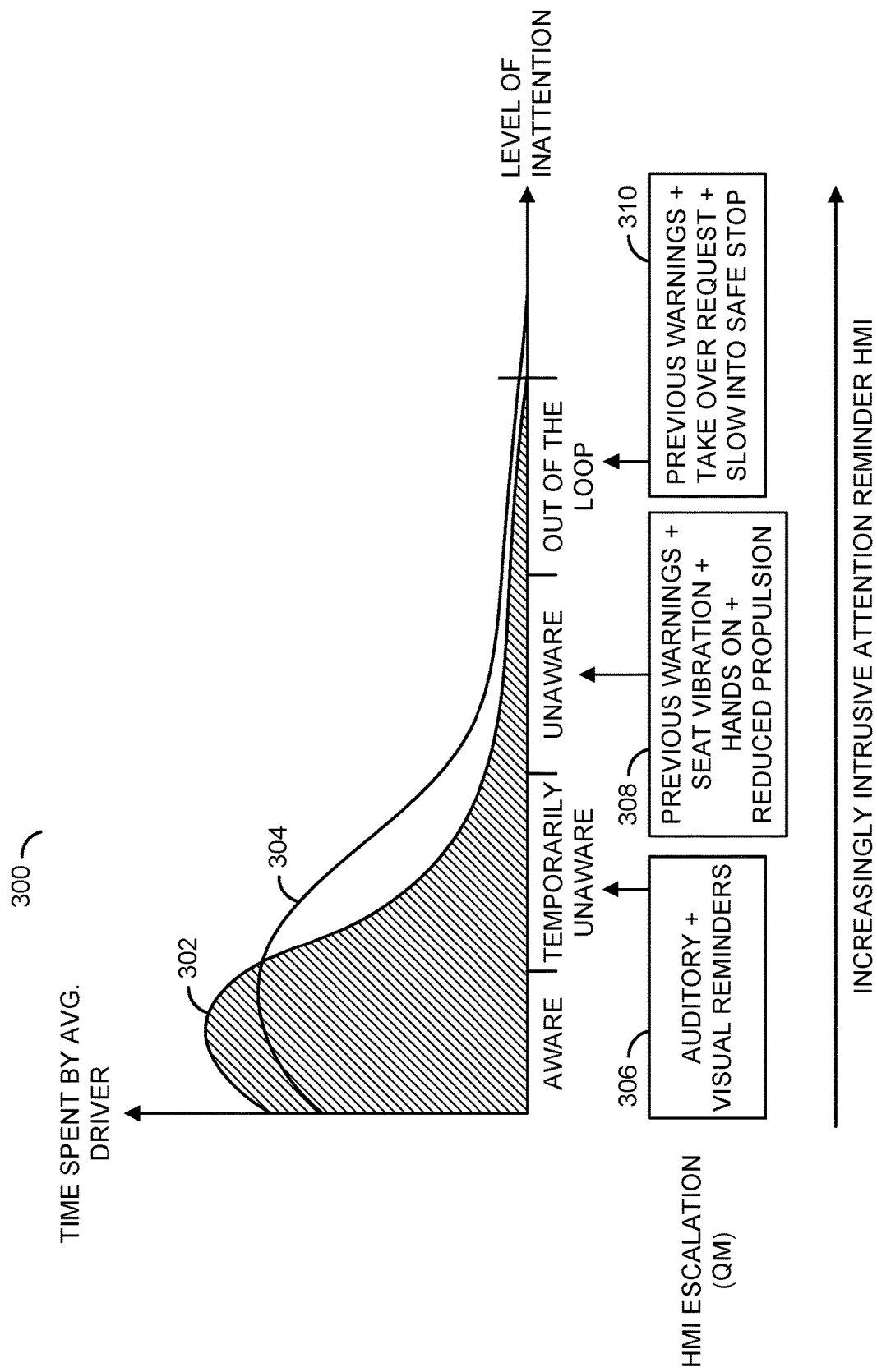
FIG. 5 is a diagram illustrating example criteria for acceptable and unacceptable driver attentiveness.

Referring to FIG. 5, a diagram is shown illustrating example criteria for acceptable and unacceptable driver attentiveness. In an example, a graph 300 illustrates a curve 302 representing an acceptable driver awareness distribution and a curve 304 representing an unacceptable driver attention distribution. In an example, the curve 302 generally represents a glance distribution that provides a desired controllability for a particular population. The curve 304 generally represents a glance distribution that does not provide the desired controllability for the particular population.

In an example, the attention monitor 102 generally implements a driver awareness level escalation regime that may generate warnings at a number of different levels (e.g., 306, 308, and 310) via the HMI 96 and detects insufficient attention related to short term shared visual attention (e.g., from involvement in a secondary tasks). In an example, the attention monitor 102 may observe driver glance behavior over a short duration of time to determine an awareness level. In an example, if over a short period of time (e.g., a few seconds) the driver is eyes-off-road 50% of the time or over a longer period of time (e.g., 4-5 times as long as the short period) the driver is eyes-off-road 30% of the time, the attention monitor 102 may indicate the driver is not aware. In an example, the attention monitor 102 may generate warnings at three different levels: temporarily unaware, unaware, out of the loop. However, other numbers of levels may be implemented to meet design criteria of a particular application.

In an example, the number of warnings may include, but are not limited to, auditory and visual reminders, haptic reminder (e.g., seat vibration), hands on, reduced propulsion, take over request, and slow into a safe stop. In an example, for the temporarily unaware level, the attention monitor 102 may generate the warning 306 comprising auditory and visual reminders. For the unaware level, the attention monitor 102 may generate the warning 308 comprising auditory and visual reminders plus seat vibration, hands on and reduced propulsion. For the out-of-the-loop level, the attention monitor 102 may generate the warning 310 comprising auditory and visual reminders, seat vibration, hands on, reduced propulsion, plus a take over request and slowing the vehicle to a safe stop.

In an example, the HMIM 104 generally tracks the output of attention monitor 102, which generally provides a level of inattention for the driver as shown on the x-axis. If at any time, the glance distribution changes from the glance distribution that provides a desired controllability for a particular population (e.g., the curve 302) to a glance distribution that does not provide the desired controllability for the particular population (e.g., the curve 304), the HMIM 104 may assert control and indicate that the driver is "insufficiently attentive" even if the attention monitor 102 at the instant says the driver is aware. The HMIM 104 and the attention monitor 102 generally operate in different time horizons.

Figure 6:
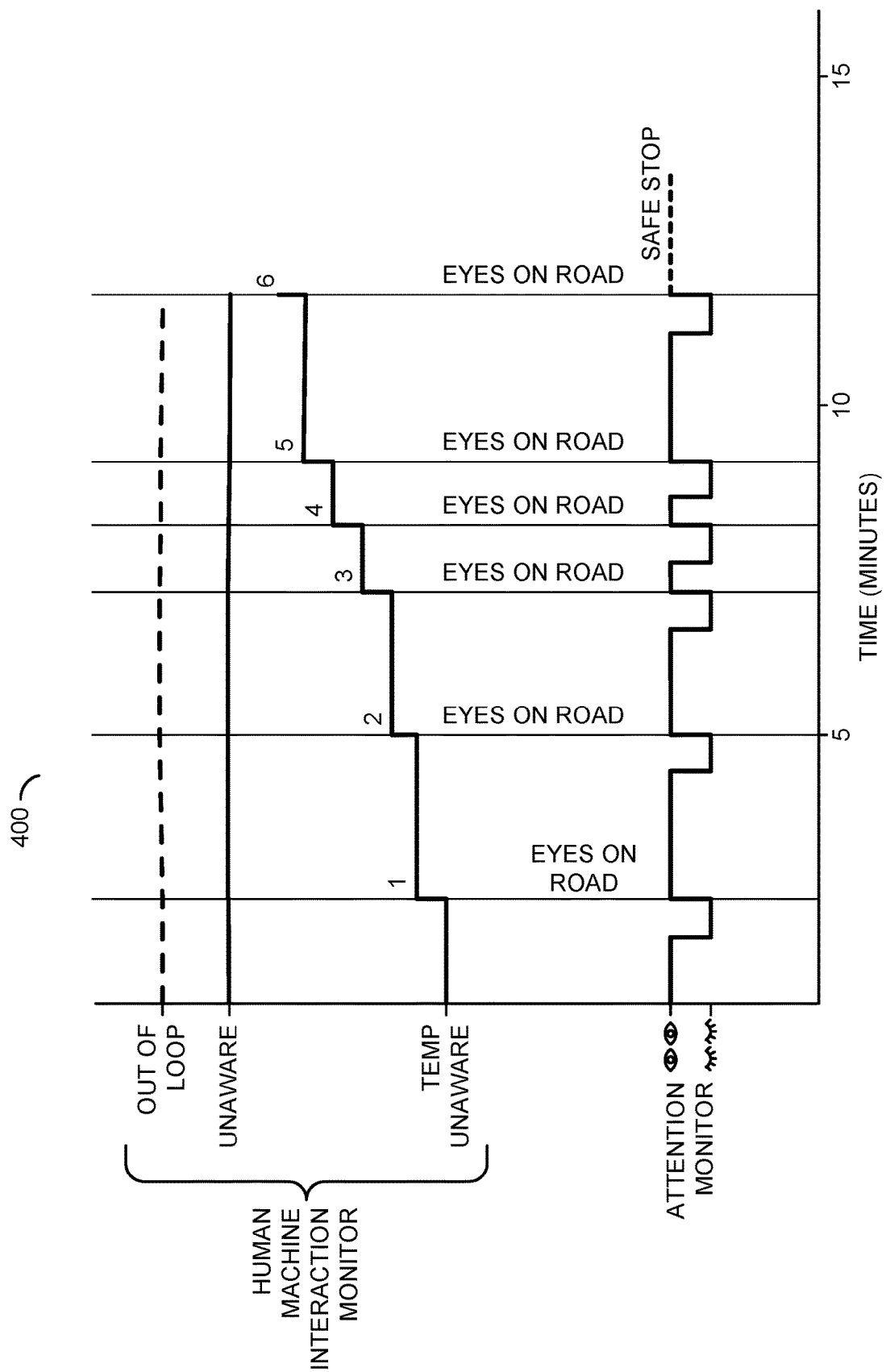
FIG. 6 is a diagram illustrating an example operation of a system in accordance with an embodiment of the invention.

Referring to FIG. 6, a diagram is shown illustrating an example operation of an HMIM system in accordance with an embodiment of the invention. In an example, the attention monitor 102 may be configured to present a signal having a first state indicating the eyes of the driver are on the road and a second state indicating the eyes of the driver are not on the road. In an example, the HMIM 104 may be configured to capture and increment (or count or accumulate) states of inattention (e.g., temporarily unaware, unaware, and out of loop) as the states of inattention are output by the attention monitor 102 during a particular period of time (e.g., 15 minutes). In the example illustrated, the driver is bouncing between the aware state and the temporarily unaware state. Each time the driver enters the temporarily unaware state the HMIM 104 logs the incident of inattention (e.g., by incrementing a count of the number of transitions for each inattentive state). Once the HMIM 104 captures (accumulates) six incidents (transitions) within the 15 minute time window, the HMIM 104 transitions control back to the driver and sends the vehicle into a safe stop mode. In an example, a similar consequence may also be triggered by the driver entering into the unaware state three times or the out-of-the-loop state one time within the 15 minute time window.

Referring to FIGS. 7-13, diagrams are shown illustrating example interactions between a driver and a driver attentiveness estimation system in accordance with an embodiment of the invention. In an example, the HMIM 104 may be configured as described above in connection with FIG. 6. In an example, the HMIM 104 may be configured to monitor the output by the attention monitor 102 using a period (monitoring duration) of fifteen minutes. In an example, the HMIM 104 may be configured to transition control back to the driver and send the vehicle into a safe stop mode in response to capturing six incidents of the driver being temporarily unaware within the 15 minute time window. A similar consequence may also be triggered by the driver entering into the unaware state three times or the out-of-the-loop state one time within the 15 minute time window.

Figure 7:
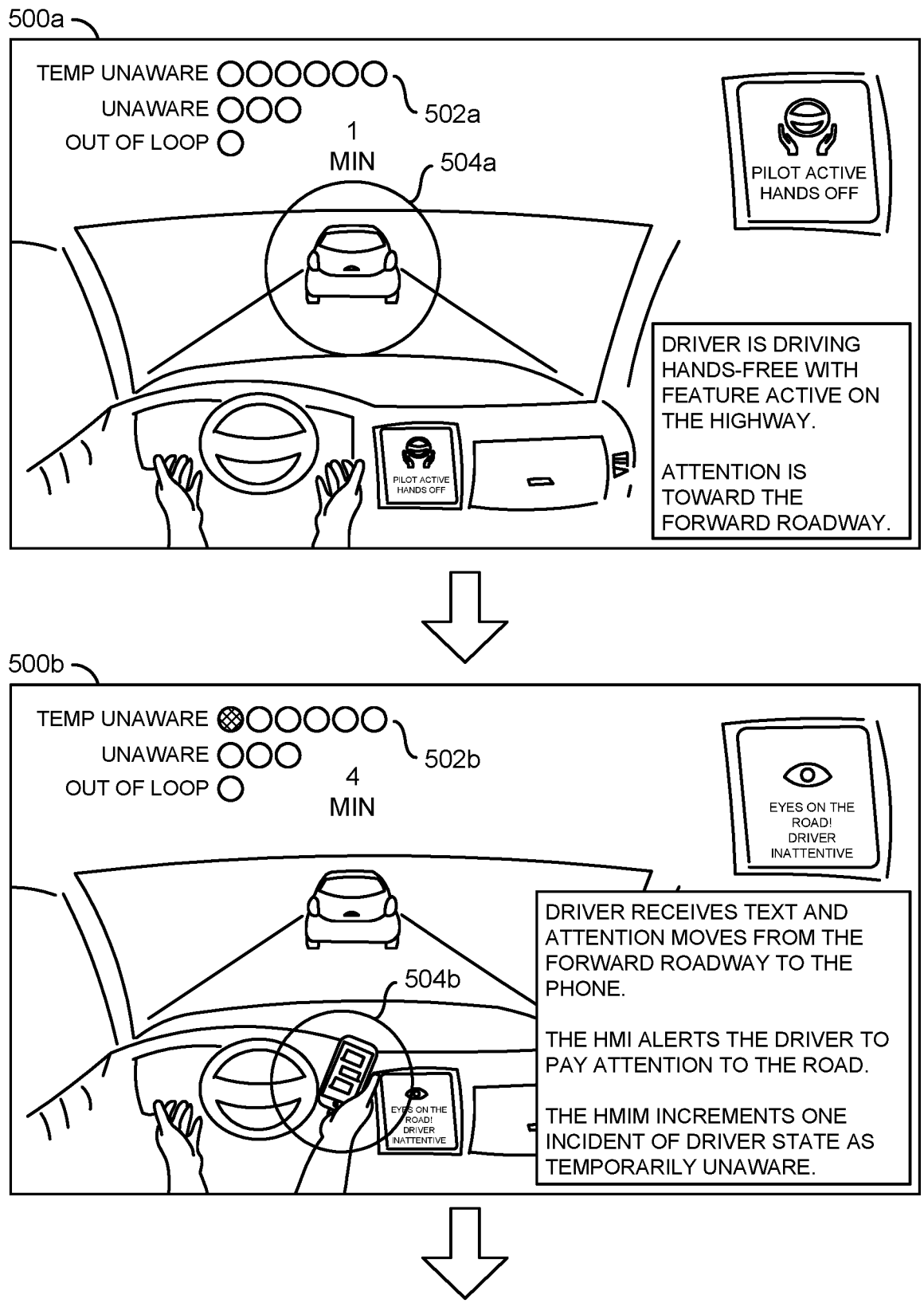
FIGS. 7-13 are diagrams illustrating example interactions between a driver and a system in accordance with an example embodiment of the invention.

Referring to FIG. 7, a diagram is shown illustrating the HMIM 104 capturing a first incident of the driver being temporarily unaware within the 15 minute time window. A picture 500a and a picture 500b are shown illustrating a view within a cockpit of a vehicle from the perspective of the driver. A display 502a illustrates a current status for the criteria used by the HMIM 104 to determine whether to transition control back to the driver and send the vehicle into a safe stop mode prior to any incidents of inattentiveness. A circle 504a is shown indicating where the attention of the driver is directed. In an example, the driver is driving hands-free with an ADAS feature active on the highway. The attention of the driver is toward the forward roadway. The attention monitor 102 has not reported any transitions from the aware state to the temporarily unaware, unaware, or out-of-loop states.

In the picture 500b, a display 502b illustrates the current status for the criteria used by the HMIM 104 to determine whether to transition control back to the driver and send the vehicle into a safe stop mode after a first incident of the driver being labeled as temporarily unaware by the attention monitor 102 at four minutes into the 15 minute time window. A circle 504b is shown indicating where the attention of the driver is directed when the attention monitor 102 labeled the driver as temporarily unaware. In an example, the driver receives a text message and the attention of the driver moves from the forward roadway to the phone. The HMI 96 alerts the driver to pay attention to the road. The HMIM 104 increments the temporarily unaware criteria one incident.

Figure 8:
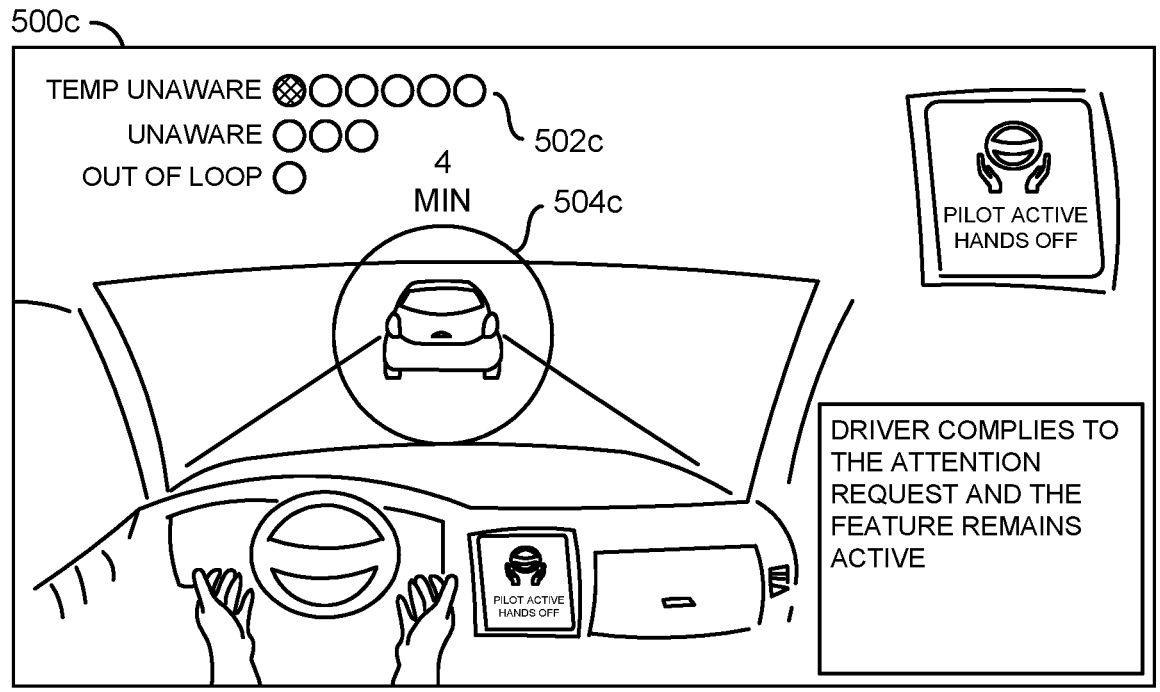
Figure 8:
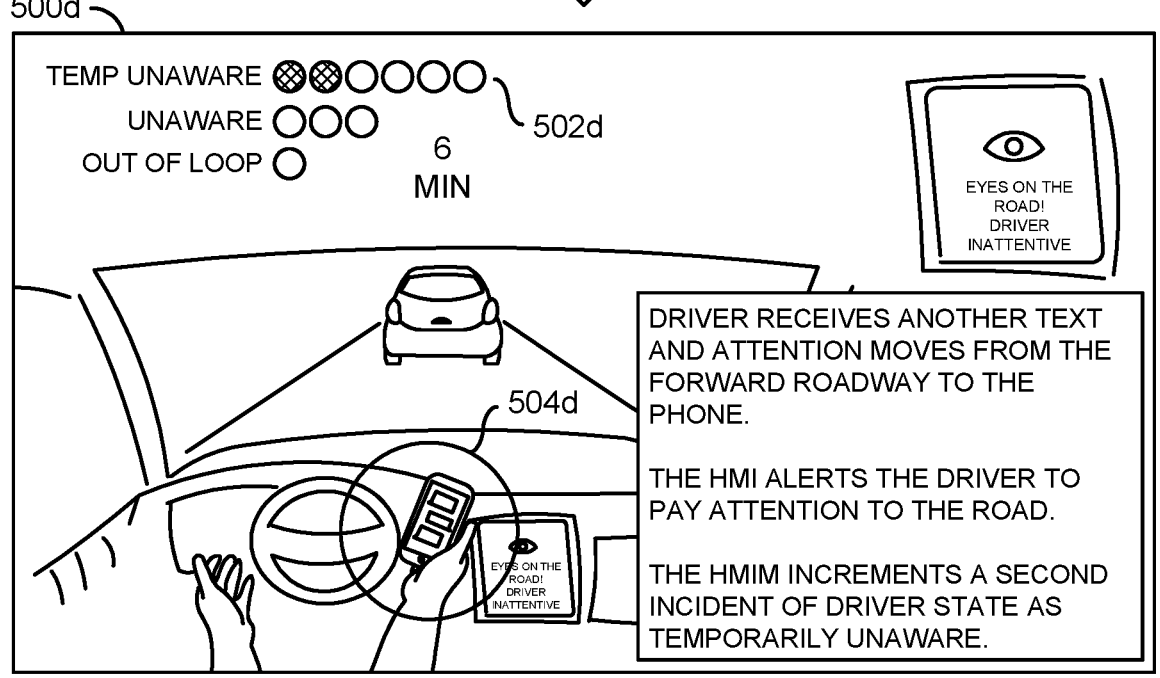

Referring to FIG. 8, a diagram is shown illustrating the HMIM 104 capturing a second incident of the driver being temporarily unaware within the 15 minute time window. A picture 500c and a picture 500d are shown illustrating the view within the cockpit of the vehicle from the perspective of the driver. A display 502c illustrates a current status for the criteria used by the HMIM 104 to determine whether to transition control back to the driver and send the vehicle into a safe stop mode following the first incident of inattentiveness at four minutes into the 15 minute window. A circle 504c is shown indicating where the attention of the driver is directed. In an example, the driver complied to the attention request. The driver is driving hands-free with the ADAS feature remaining active on the highway. The attention of the driver is toward the forward roadway.

In the picture 500d, a display 502d illustrates the current status for the criteria used by the HMIM 104 to determine whether to transition control back to the driver and send the vehicle into a safe stop mode after the second incident of the driver being labeled as temporarily unaware by the attention monitor 102 at six minutes into the 15 minute time window. A circle 504d is shown indicating where the attention of the driver is directed when the attention monitor 102 labeled the driver as temporarily unaware. In an example, the driver receives another text message and the attention of the driver moves from the forward roadway to the phone. The HMIM 96 alerts the driver to pay attention to the road. The HMIM 104 increments the temporarily unaware criteria one incident to two incidents total.

Figure 9:
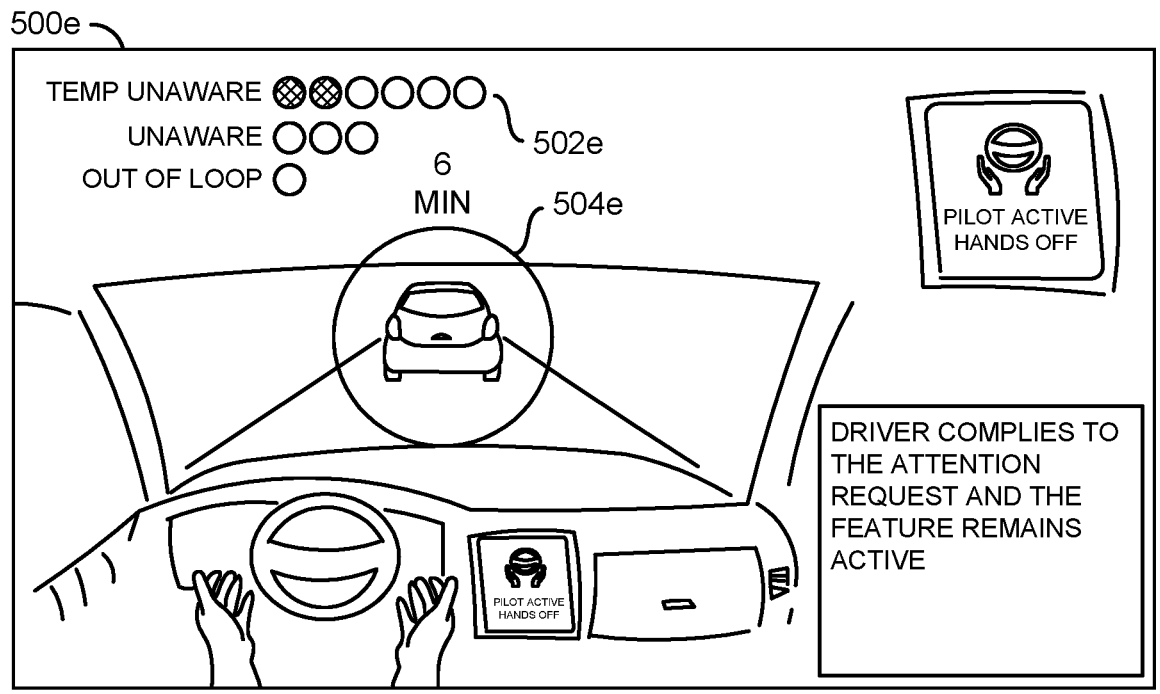
Figure 9:
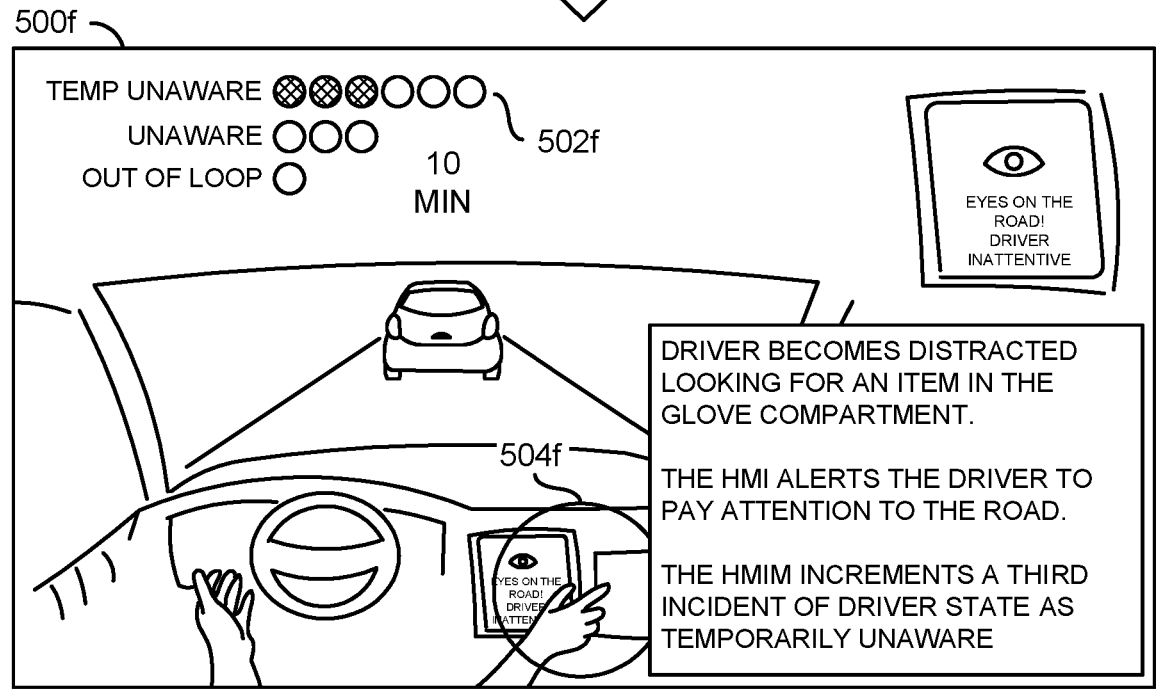

Referring to FIG. 9, a diagram is shown illustrating the HMIM 104 capturing a third incident of the driver being temporarily unaware within the 15 minute time window. A picture 500e and a picture 500f are shown illustrating the view within the cockpit of the vehicle from the perspective of the driver. A display 502e illustrates a current status for the criteria used by the HMIM 104 to determine whether to transition control back to the driver and send the vehicle into a safe stop mode following the second incident of inattentiveness at six minutes into the 15 minute window. A circle 504e is shown indicating where the attention of the driver is directed. In an example, the driver complied to the attention request. The driver is driving hands-free with the ADAS feature remaining active on the highway. The attention of the driver is again toward the forward roadway.

In the picture 500f, a display 502f illustrates the current status for the criteria used by the HMIM 104 to determine whether to transition control back to the driver and send the vehicle into a safe stop mode after the third incident of the driver being labeled as temporarily unaware by the attention monitor 102 at ten minutes into the 15 minute time window. A circle 504f is shown indicating where the attention of the driver is directed when the attention monitor 102 labeled the driver as temporarily unaware. In an example, the driver becomes distracted looking for an item in the glove compartment of the vehicle. The HMI 96 alerts the driver to pay attention to the road. The HMIM 104 increments the temporarily unaware criteria one incident to three incidents total.

Figure 10:
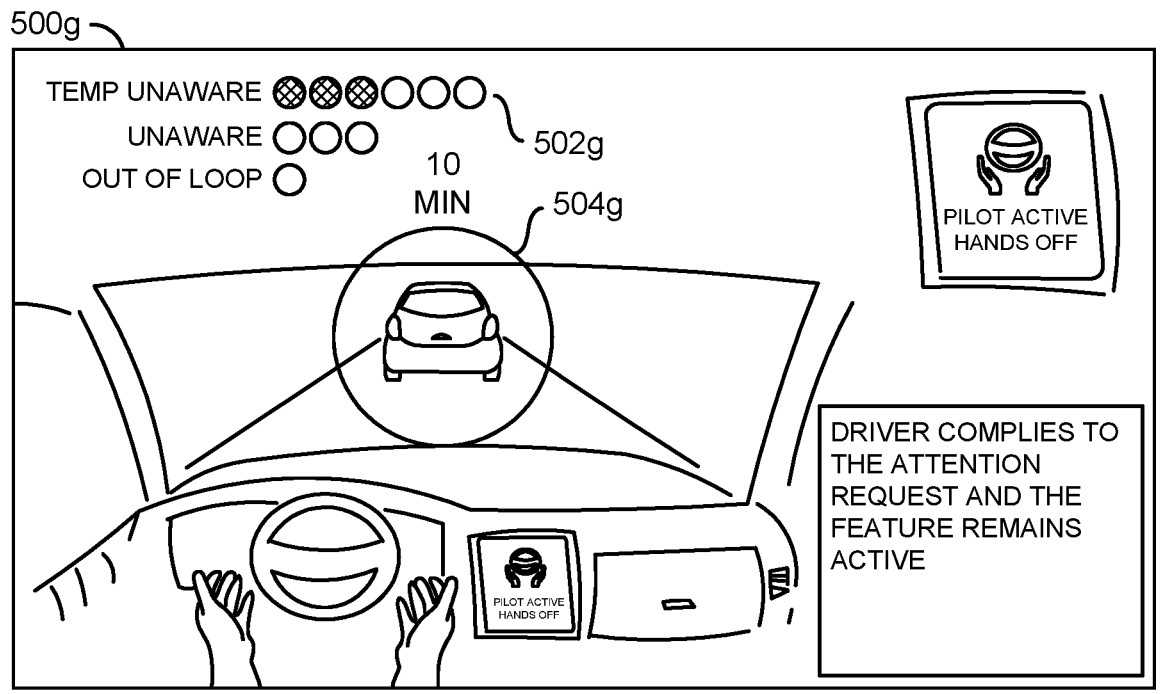
Figure 10:
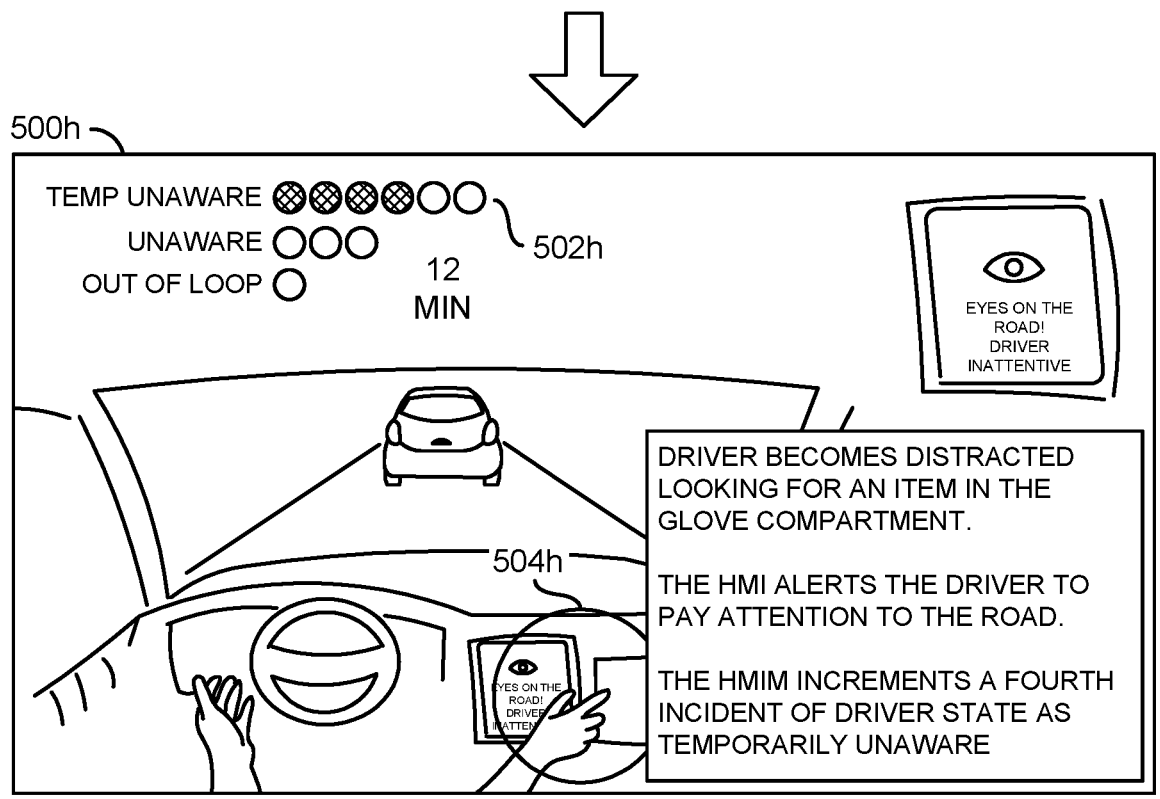

Referring to FIG. 10, a diagram is shown illustrating the HMIM 104 capturing a fourth incident of the driver being temporarily unaware within the 15 minute time window. A picture 500g and a picture 500h are shown illustrating the view within the cockpit of the vehicle from the perspective of the driver. A display 502g illustrates a current status for the criteria used by the HMIM 104 to determine whether to transition control back to the driver and send the vehicle into a safe stop mode following the third incident of inattentiveness at ten minutes into the 15 minute window. A circle 504g is shown indicating where the attention of the driver is directed. In an example, the driver complied to the attention request. The driver is driving hands-free with the ADAS feature remaining active on the highway. The attention of the driver is again toward the forward roadway.

In the picture 500h, a display 502h illustrates the current status for the criteria used by the HMIM 104 to determine whether to transition control back to the driver and send the vehicle into a safe stop mode after the fourth incident of the driver being labeled as temporarily unaware by the attention monitor 102 at twelve minutes into the 15 minute time window. A circle 504h is shown indicating where the attention of the driver is directed when the attention monitor 102 labeled the driver as temporarily unaware. In an example, the driver becomes distracted looking for an item in the glove compartment of the vehicle. The HMI 96 alerts the driver to pay attention to the road. The HMIM 104 increments the temporarily unaware criteria one incident to four incidents total.

Figure 11:
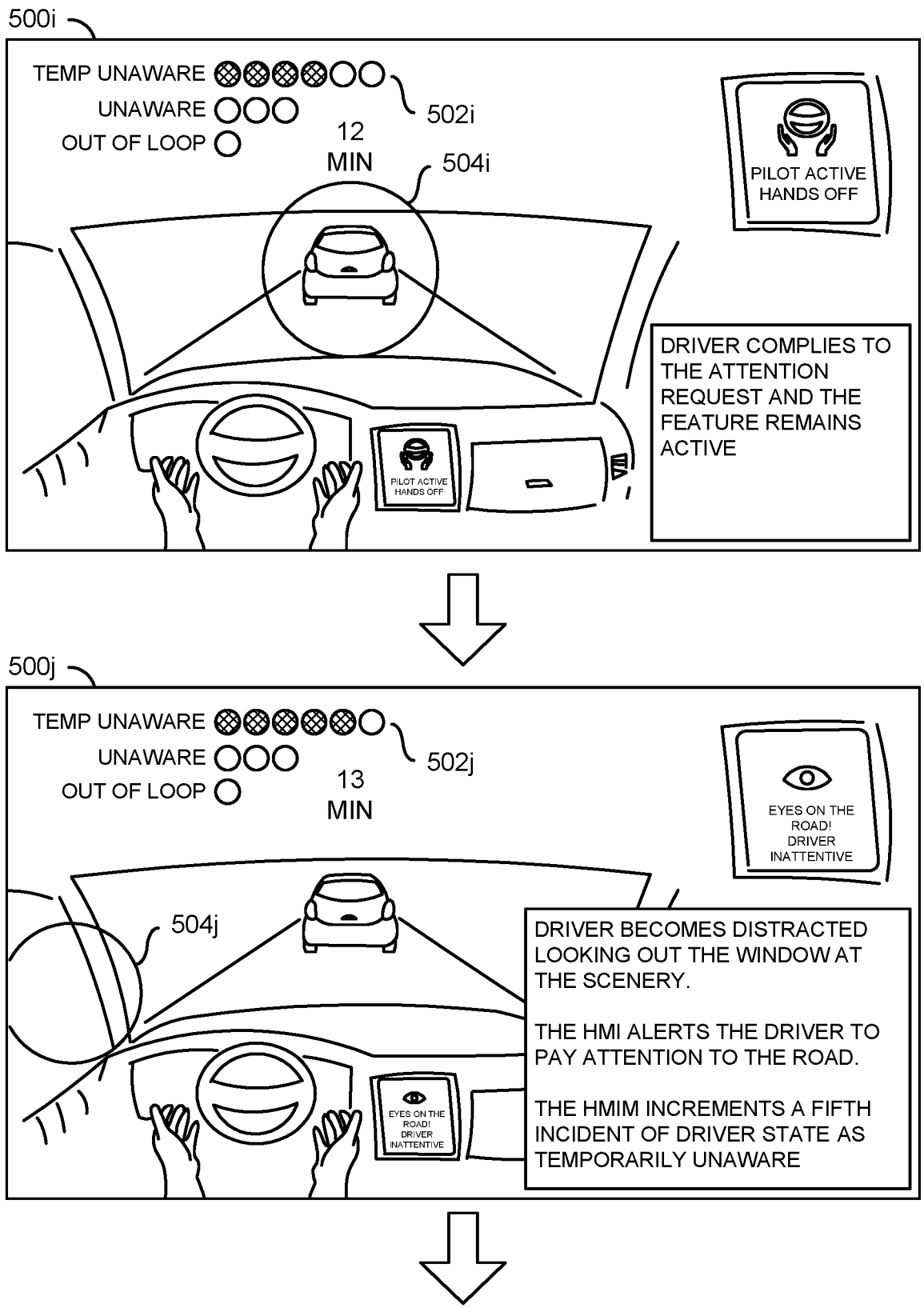

Referring to FIG. 11, a diagram is shown illustrating the HMIM 104 capturing a fifth incident of the driver being temporarily unaware within the 15 minute time window. A picture 500i and a picture 500j are shown illustrating the view within the cockpit of the vehicle from the perspective of the driver. A display 502i illustrates a current status for the criteria used by the HMIM 104 to determine whether to transition control back to the driver and send the vehicle into a safe stop mode following the fourth incident of inattentiveness at twelve minutes into the 15 minute window. A circle 504i is shown indicating where the attention of the driver is directed. In an example, the driver complied to the attention request. The driver is driving hands-free with the ADAS feature remaining active on the highway. The attention of the driver is again toward the forward roadway.

In the picture 500j, a display 502j illustrates the current status for the criteria used by the HMIM 104 to determine whether to transition control back to the driver and send the vehicle into a safe stop mode after the fifth incident of the driver being labeled as temporarily unaware by the attention monitor 102 at thirteen minutes into the 15 minute time window. A circle 504j is shown indicating where the attention of the driver is directed when the attention monitor labeled the driver as temporarily unaware. In an example, the driver becomes distracted looking out a window of the vehicle at scenery passing by the vehicle. The HMI 96 alerts the driver to pay attention to the road. The HMIM 104 increments the temporarily unaware criteria one incident to five incidents total.

Figure 12:
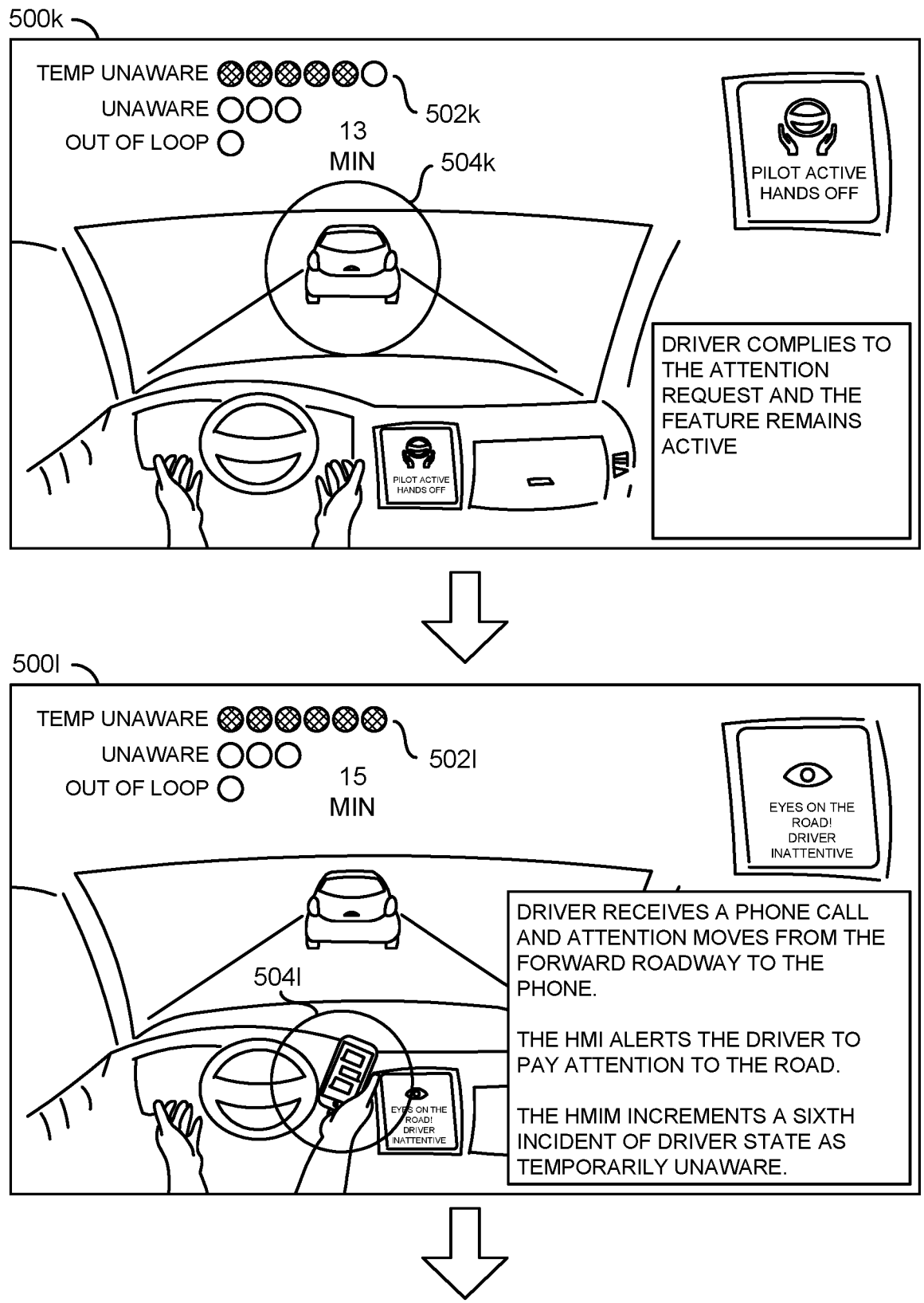

Referring to FIG. 12, a diagram is shown illustrating the HMIM 104 capturing a sixth incident of the driver being temporarily unaware within the 15 minute time window. A picture 500k and a picture 500l are shown illustrating the view within the cockpit of the vehicle from the perspective of the driver. A display 502k illustrates a current status for the criteria used by the HMIM 104 to determine whether to transition control back to the driver and send the vehicle into a safe stop mode following the fifth incident of inattentiveness at thirteen minutes into the 15 minute window. A circle 504k is shown indicating where the attention of the driver is directed. In an example, the driver complied to the attention request. The driver is driving hands-free with the ADAS feature remaining active on the highway. The attention of the driver is toward the forward roadway.

In the picture 500l, a display 502l illustrates the current status for the criteria used by the HMIM 104 to determine whether to transition control back to the driver and send the vehicle into a safe stop mode after the sixth incident of the driver being labeled as temporarily unaware by the attention monitor 102 at fifteen minutes into the 15 minute time window. A circle 504l is shown indicating where the attention of the driver is directed when the attention monitor 102 labeled the driver as temporarily unaware. In an example, the driver receives a phone call and the attention of the driver moves from the forward roadway to the phone. The HMI 96 alerts the driver to pay attention to the road. The HMIM 104 increments the temporarily unaware criteria one incident to six incidents total.

Figure 13:
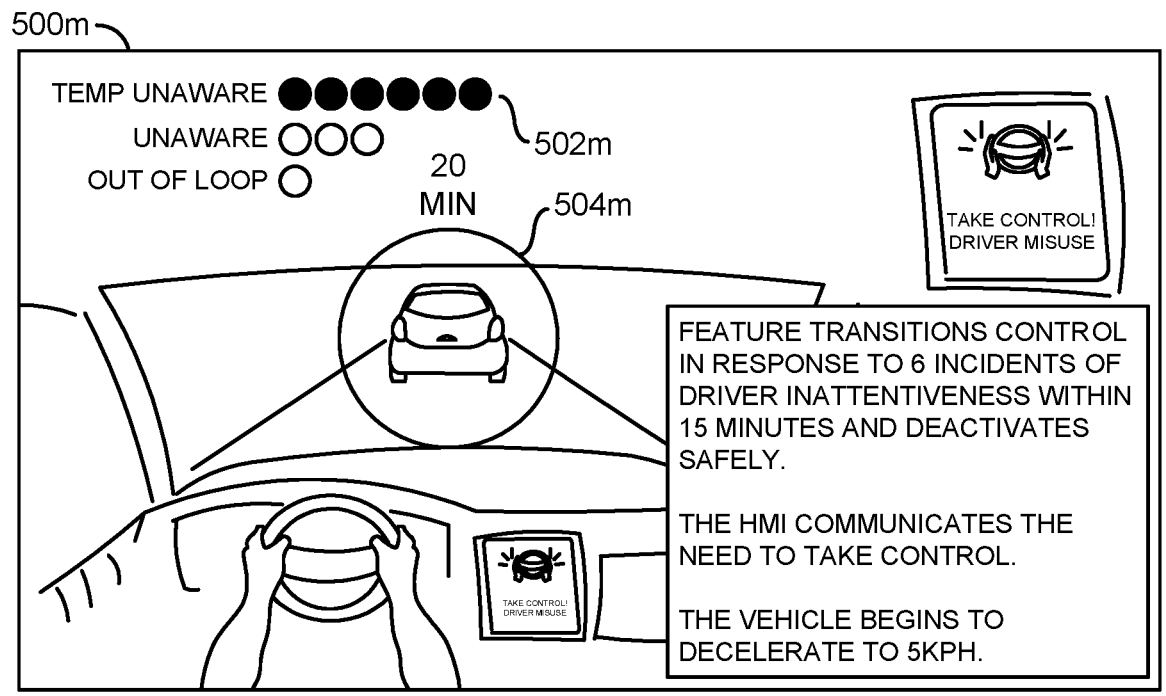

Referring to FIG. 13, a diagram is shown illustrating the HMIM 104 after capturing the sixth incident of the driver being temporarily unaware within the 15 minute time window. A picture 500*m* is shown illustrating the view within the cockpit of the vehicle from the perspective of the driver. A display 502*m* illustrates a current status for the criteria used by the HMIM 104 to determine whether to transition control back to the driver and send the vehicle into a safe stop mode following the sixth incident of inattentiveness at twenty minutes. A circle 504*m* is shown indicating where the attention of the driver is directed. In an example, the HMIM 104 transitions control back to the driver and safely discontinues the ADAS feature in response to six incidents of the driver being inattentive within the fifteen minute period. The HMI 96 alerts the driver to take control of the vehicle. The vehicle begins to decelerate to 5 kph.

In general, when the HMIM 104 determines that something is wrong, the HMIM 104 requests that the driver take over operation of the vehicle and safely discontinues the automation feature. Because discontinuing activity of the automation feature at high speed may be unsafe as well, particularly when the driver is known to not be aware, the HMIM 104 may use the HMI 96 to present a request for the driver to take over operation of the vehicle. In an example, the HMIM 104 may facilitate a safe transition by slowly degrading operation of the automation feature to a safe state (e.g., decelerating to a safe speed and/or a safe stop) before completely discontinuing collaborative operation. However, other strategies for discontinuing collaborative operation may be implemented to meet design criteria of a particular situation or application.

Figure 14:
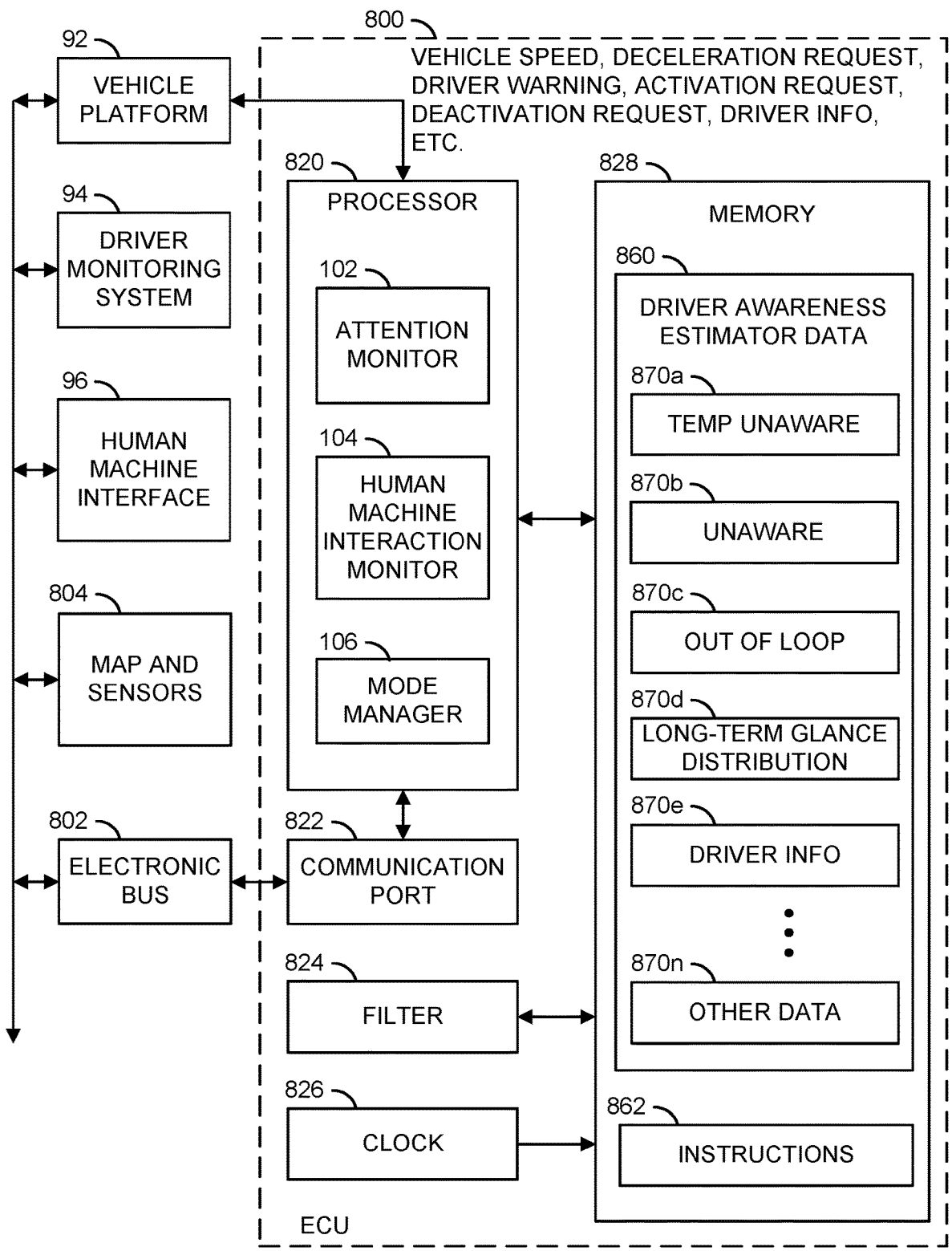
FIG. 14 is a diagram illustrating an electronic control unit implementing an advanced driver-assistance systems (ADAS) feature control system in accordance with an example embodiment of the invention.

Referring to FIG. 14, a diagram illustrating an electronic control module implementing an advanced driver-assistance systems (ADAS) feature control system in accordance with an example embodiment of the invention is shown. In an example, an apparatus 800 may implement an electronic control unit or module (ECU). In an example, the electronic control module (ECU) 800 may be implemented as a domain controller (DC). In another example, the ECU 800 may be implemented as an active safety domain master (ASDM). In various embodiments, the ECU 800 may be configured to control activation of one or more features (or functions) of an ADAS component of a vehicle. In various embodiments, the driver attentiveness estimator 100 may be implemented within the ECU 800. In an example, the ECU 800 may be connected to the vehicle platform 92, the driver monitoring system (DMS) 94, the human machine interface (HMI) 96, an electronic bus 802, and map and sensors 804 of the vehicle. In an example, the ECU 800 may be configured to (i) receive the signals VEHICLE SPEED, DEACTIVATION REQUEST, ACTIVATION REQUEST, and DRIVER INFO from the vehicle systems and communicate the signals DECELERATION REQUEST and DRIVER WARNING to the systems of the vehicle.

In an example, the ECU 800 may be connected to a block (or circuit) 802. The circuit 802 may implement an electronic bus. The electronic bus 802 may be configured to transfer data between the ECU 800 and the vehicle platform 92, the DMS 94, the HMI 96, and the map and sensors 804 (e.g., the HD map receiver 260, the GNSS receiver 262, the forward looking camera (FLC) 250, the corner/side radar sensors 252*a*-252*n*, the forward looking radar (FLR) sensor 254, and the inertial measurement unit 264. In some embodiments, the electronic bus 802 may be implemented as a vehicle Controller Area Network (CAN) bus. The electronic bus 802 may be implemented as an electronic wired network and/or a wireless network. Generally, the electronic bus 802 may connect one or more components of the vehicle 50 to enable a sharing of information in the form of digital signals (e.g., a serial bus, an electronic bus connected by wiring and/or interfaces, a wireless interface, etc.).

The ECU 800 generally comprises a block (or circuit) 820, a block (or circuit) 822, a block (or circuit) 824, a block (or circuit) 826, and a block (or circuit) 828. The circuit 820 may implement a processor. The circuit 822 may implement a communication port. The circuit 824 may implement a filter. The circuit 826 may implement a clock. The circuit 828 may implement a memory. Other blocks (not shown) may be implemented (e.g., I/O ports, power connectors, interfaces, etc.). The number and/or types of circuits implemented by the module 800 may be varied according to the design criteria of a particular implementation.

The processor 820 may be implemented as a microcontroller, a multi-thread microprocessor, or any combination thereof. The processor 820 may comprise a block (or circuit) implementing the attention monitor 102, a block (or circuit) implementing the human machine interaction monitor 104, and/or a block (or circuit) implementing the mode manage 106. The processor 820 may comprise other components (not shown). In some embodiments, the processor 820 may be a combined (e.g., integrated) chipset implementing processing functionality. In some embodiments, the processor 820 may be comprised of a number of separate circuits (e.g., the microcontroller, the multi-thread microprocessor, a digital signal processor (DSP), a graphics processing unit (GPU), etc.). The design of the processor 820 and/or the functionality of various components of the processor 820 may be varied according to the design criteria of a particular implementation. The processor 820 is shown sending data to and/or receiving data from the vehicle platform 92, the communication port 822, and/or the memory 828.

The memory 828 may comprise a block (or circuit) 860 and a block (or circuit) 862. The block 860 may store driver awareness (or attentiveness) estimator (DAE) data. The block 862 may store computer readable instructions (e.g., instructions readable by the processor 820). The DAE data 860 may store various data sets 870*a*-870*n*. For example, the data sets 870*a*-870*n* may comprise a count of transitions to the temporarily unaware state 870*a*, *c* a count of transitions to the unaware state 870*b*, a count of transitions to the out-of-loop state 870*c*, a long-term glance distribution 870*d*, driver info 870*e* and/or other data 870*n*.

In an example, the other data 870*n* may comprise parameters (e.g., coefficients) used to transform data received from the sensors (e.g., FLC, FLR, FCR, FCS, and IMU). The calibration data 870*n* may provide many sets of coefficients (e.g., one set of coefficients for each of the sensors). The calibration data 870*n* may be updatable. For example, the calibration data 870*n* may store current values as coefficients for the sensors and as the data from the sensors drifts the module 800 may update the calibration data 870*n* in order to maintain accuracy. The format of the calibration data 870*n* may vary based on the design criteria of a particular implementation.

Various other types of data (e.g., the other data 870*n*) may be stored as part of the DAE data 860. For example, the other data 970*n* may store glance distributions for a plurality of drivers. For example, the other data 870*n* may store past data values of the calibration data and/or current data values of the calibration data. The past and current data values of the calibration data may be compared to determine trends used to extrapolate and/or predict potential future values for the calibration data.

The processor 820 may be configured to execute stored computer readable instructions (e.g., the instructions 862 stored in the memory 828). The processor 820 may perform one or more steps based on the stored instructions 862. In an example, steps of the instructions 862 may be executed/performed by the processor 820 and may implement one or more of the attention monitor 102, the human machine interaction monitor 104, and the mode manager 106. The instructions executed and/or the order of the instructions 862 performed by the processor 820 may be varied according to the design criteria of a particular implementation.

The communication port 822 may allow the module 800 to communicate with external devices such as the map and sensors 804, the vehicle platform 92, the driver monitoring system 94, and the human machine interface 96. For example, the module 800 is shown connected to the external electronic bus 802. In an example, information from the module 800 may be communicated to an infotainment device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 800 to be displayed to a user.

The filter 826 may be configured to perform a linear quadratic estimation. For example, the filter 824 may implement a Kalman filter. Generally, the filter 824 may operate recursively on input data to produce a statistically optimal estimate. For example, the filter 824 may be used to calculate the position coordinates 870*a* and/or estimate the accuracy of the position coordinates 870*a*. In some embodiments, the filter 824 may be implemented as a separate module. In some embodiments, the filter 824 may be implemented as part of the memory 828 (e.g., the stored instructions 862). The implementation of the filter 824 may be varied according to the design criteria of a particular implementation.

The clock 826 may be configured to determine and/or track a time. The time determined by the clock 826 may be stored as the time stamp data 870*c*. In some embodiments, the clock 826 may be configured to compare time stamps received from a GNSS receiver.

The module 800 may be configured as a chipset, a system on chip (SoC) and/or a discrete device. For example, the module 800 may be implemented as an electronic control unit (ECU). In some embodiments, the module 800 may be configured to control activation of one or more ADAS features/functions.

Given the lack of state-of-the-art ASIL on HMI warning messages, an underlying objective of the HMIM 104 in accordance with an embodiment of the invention is to provide a monitoring functionality that ensures the sufficient controllability of a supervising driver to possible hazardous events. In an example, the HMIM 104 may achieve sufficient controllability by ensuring driver engagement. In an example, the HMIM 104 may ensure driver engagement by monitoring glance distribution patterns as a measure of attentiveness. In various embodiments, a few example functionality iterations of the HMIM 104 may be implemented to mitigate false positives during decision making.

In one example, the HMIM 104 may check the delta change in eye glance shift pre and post HMI warnings to determine whether the warning is being conveyed to the driver and to safeguard against omission of HMI messages. For example, the HMIM 104 may subscribe to a signal indicating "eyes on road" in real time from a camera of the driver monitoring system 94. The signal indicating "eyes on road" may be used as feedback to quickly evaluate whether there is improvement in glance distribution after each escalation warning. If not, the HMIM 104 may fail safe appropriately.

In another example, the HMIM 104 may intentionally try to take the eyes of the driver off the road momentarily when the attention monitor 102 reports the driver being in the "aware" state for a longer duration than expected to safeguard against false positive from the camera of the DMS 94 and attention monitor attention levels. When the driver has been reported to be "aware" for the longer time duration, the HMIM 104 may send directed prompts to divert attention of the driver away from road (when judged to be safe to do so by subscribing to environmental information from onboard sensors, GNSS, HD map, etc.) and verify whether the front-end signal chain (e.g., DMS 94, attention monitor 102, etc.) detect the diverted attention. If not, the HMIM 104 may fail safe appropriately.

In another example, other cabin sensory information may be integrated into the HMIM 104 as inputs to form a holistic driver state estimation. In addition to eyes on road information, the HMIM 104 may subscribe to hands on steering wheel, pedal information, seat sensors, seat belt status, etc. to form a holistic driver state estimation model. The HMIM 104 may leverage feedback from each of these inputs to detect and mitigate inattentiveness.

In still another example, the HMIM 104 may be developed with artificial intelligence/machine learning (AI/ML) based non-deterministic algorithms to baseline a driver attentiveness profile for each individual driver and track inattentiveness against the baseline of the particular driver. In various embodiments, each vehicle may implement a generic HMIM 104 that over time may customize itself by tracking and learning about an inattentiveness profile of the driver by baselining the inattentiveness profile of the driver against the glance distribution of the same driver during manual driving. Inattentiveness during supervised driving may then be flagged when the inattentiveness exceeds the threshold noted during prior manual driving.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive a plurality of sensor signals from a vehicle platform of a vehicle and present one or more control signals to the vehicle platform; and
a control circuit configured to (i) detect whether an attention state of a driver is in an attentive state or in one of a plurality of inattentive states, in response to one or more of the plurality of sensor signals received from the vehicle platform during a first window having a first duration, (ii) assess, for each respective one of the plurality of inattentive states, whether the driver is sufficiently attentive by monitoring the one or more of the plurality of sensor signals from the vehicle platform and determining whether a number of changes from the attentive state of the driver to the respective one of the plurality of inattentive states, during a second window having a second duration that is longer than the first duration, exceeds a respective threshold, and (iii) based on at least one of the respective thresholds being exceeded, transition operation of the vehicle to the driver and safely discontinue an automation system function of the vehicle.

2. The apparatus according to claim 1, wherein said control circuit comprises a driver attention estimator configured to (i) generate a first control signal communicating the attention state of the driver during the first window having the first duration and (ii) generate a second control signal communicating an assessment of whether the driver is sufficiently attentive for the automation system function to safely continue to operate the vehicle.

3. The apparatus according to claim 2, wherein said driver attention estimator comprises:
an attention monitor configured to determine the attention state of the driver during the first window having the first duration and generate the first control signal; and
a human machine interaction monitor configured to generate the assessment of whether the driver is sufficiently attentive during the second window having the second duration and generate the second control signal.

4. The apparatus according to claim 3, wherein said human machine interaction monitor is further configured to assess whether a human machine interface of the vehicle is successfully communicating with the driver.

5. The apparatus according to claim 3, wherein said human machine interaction monitor is further configured to determine whether the driver is gaming the attention monitor.

6. The apparatus according to claim 3, wherein said plurality of inattentive states of the attention monitor comprise one or more of a temporarily unaware state, and unaware state, and an out-of-the-loop state.

7. The apparatus according to claim 3, wherein the respective threshold for each of the plurality of inattentive states of the attention monitor is programmable.

8. The apparatus according to claim 3, wherein the human machine interaction monitor is further configured to customize itself over time by tracking and learning an inattentiveness profile of the driver.

9. The apparatus according to claim 8, wherein the human machine interaction monitor is further configured to learn the inattentiveness profile of the driver by baselining the inattentiveness profile of the driver against a glance distribution of the driver during manual driving.

10. The apparatus according to claim 3, wherein said control circuit further comprises a feature mode manager configured to activate or maintain operation of the automation system of the vehicle based on the threshold not being exceeded and safely transfer operation of the vehicle from the automation system to the driver based on the threshold being exceeded.

11. The apparatus according to claim 10, wherein said feature mode manager is configured to send a warning to the driver to take over control of the vehicle via a human machine interface of the vehicle and degrade performance of an autopilot function of the automation system by generating a deceleration request to the vehicle platform.

12. A method of controlling an automation system function of a vehicle comprising:
receiving a plurality of sensor signals from a vehicle platform of a vehicle;
detecting whether an attention state of a driver is in an attentive state or in one of a plurality of inattentive states, in response to one or more of the plurality of sensor signals received from the vehicle platform during a first window having a first duration;
assessing, for each respective one of the plurality of inattentive states, whether the driver is sufficiently attentive by monitoring the one or more of the plurality of sensor signals from the vehicle platform and determining whether a number of changes from the attentive state of the driver to the respective one of the plurality of inattentive states, during a second window having a second duration that is longer than the first duration, exceeds a respective threshold, and
based on at least one of the respective thresholds being exceeded, transferring operation of the vehicle to the driver and safely discontinue an automation system function of the vehicle.

13. The method according to claim 12, further comprising using a driver attention estimator of an electronic control unit of the vehicle to (i) generate a first control signal communicating the attention state of the driver during the first window having the first duration and (ii) generate a second control signal communicating an assessment of whether the driver is sufficiently attentive for the automation system function to safely continue to operate the vehicle.

14. The method according to claim 13, wherein said driver attention estimator comprises:
an attention monitor configured to determine the attention state of the driver during the first window having the first duration and generate the first control signal;
and a human machine interaction monitor configured to generate the assessment of whether the driver is sufficiently attentive during the second window having the second duration and generate the second control signal.

15. The method according to claim 14, further comprising using the human machine interaction monitor to assess whether a human machine interface of the vehicle is successfully communicating with the driver.

* * * * *